Figure 1:
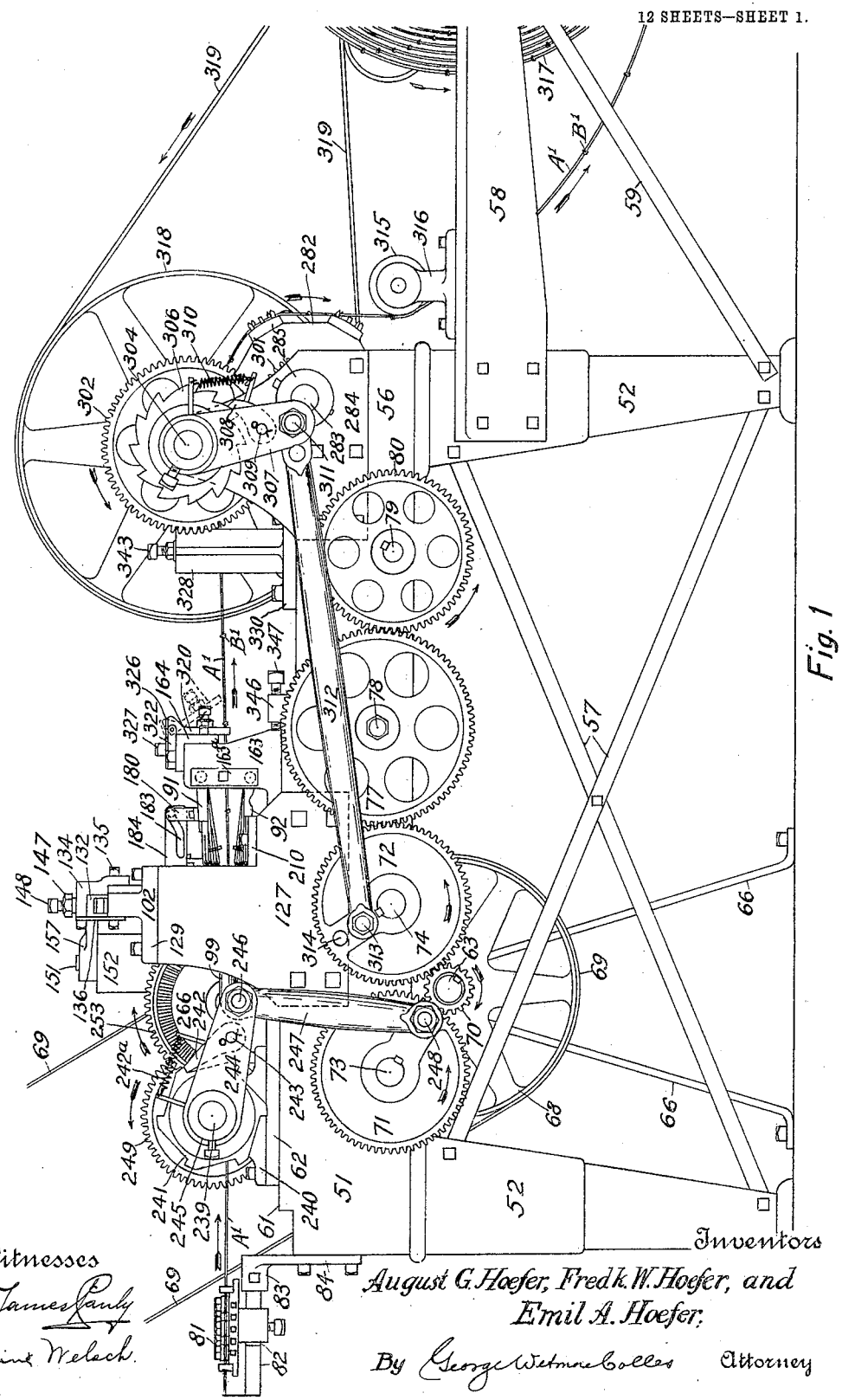

No. 804,846. PATENTED NOV. 21, 1905.
A. G., F. W. & E. A. HOEFER.
WIRE FENCE MACHINE.
APPLICATION FILED JAN. 17, 1905.
12 SHEETS—SHEET 2.

Witnesses
A. James Pauly
Pauline Welsch

Inventors
August G. Hoefer
Frederick W. Hoefer
Emil A. Hoefer
By George Wetmore Colles
Attorney No. 804,846. PATENTED NOV. 21, 1905.
A. G., F. W. & E. A. HOEFER.
WIRE FENCE MACHINE.
APPLICATION FILED JAN. 17, 1905.

12 SHEETS—SHEET 3.

Witnesses
A. James Pauly
Pauline Welsch

Inventors
August G. Hoefer, Fred'k W. Hoefer,
and Emil A. Hoefer
By George Wetmore Colles
Attorney

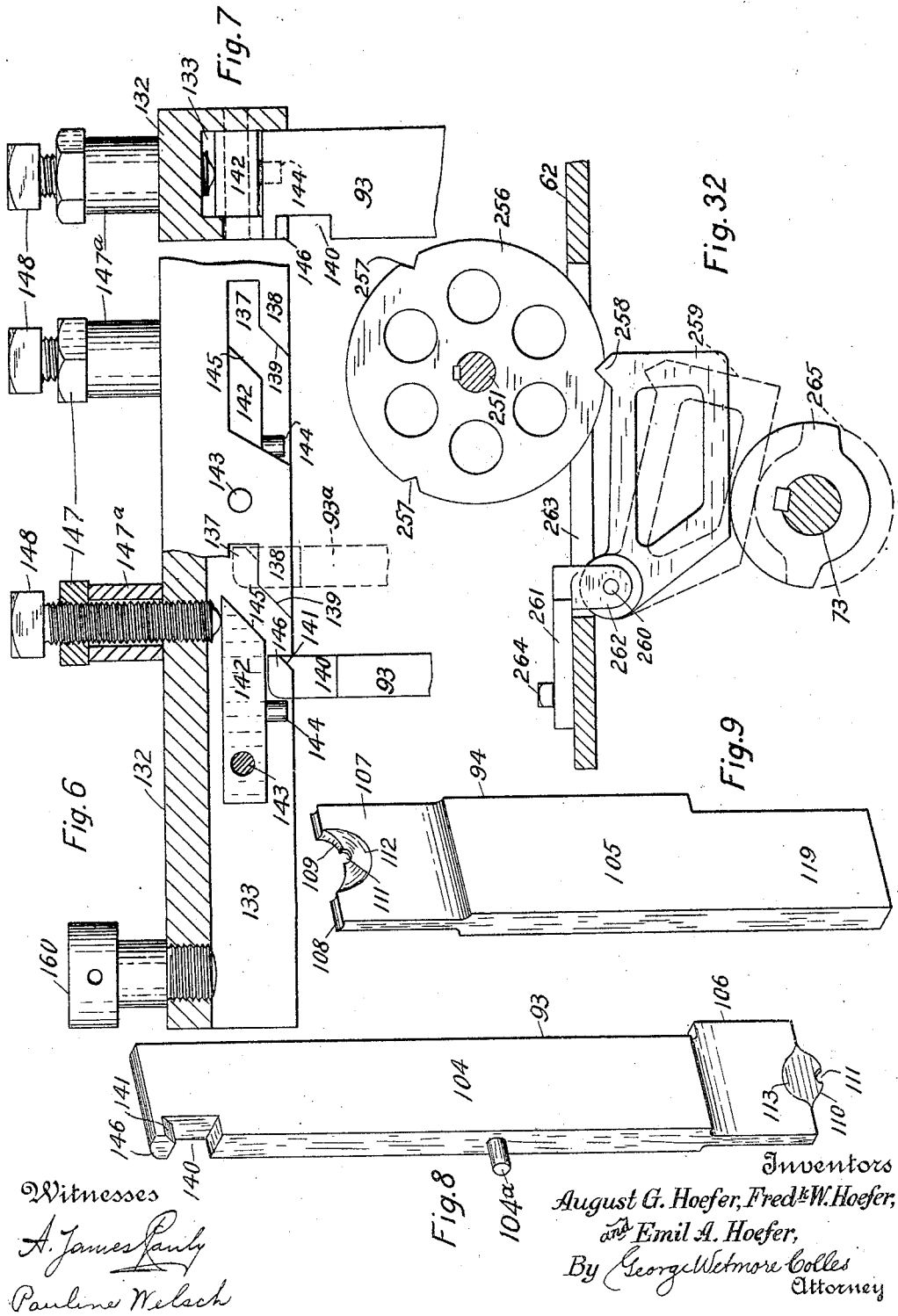

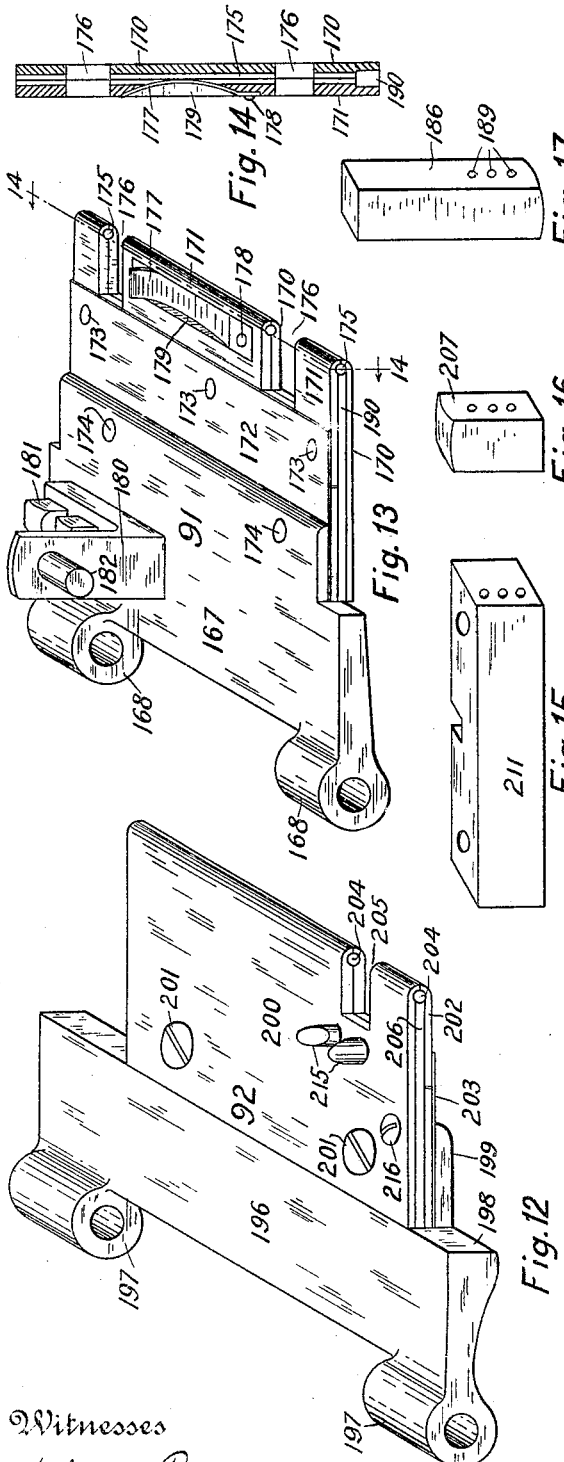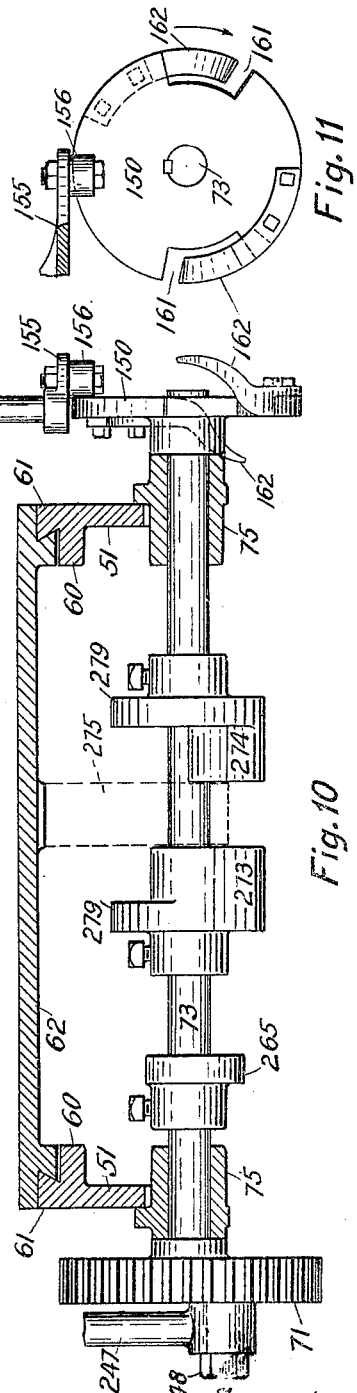

No. 804,846. PATENTED NOV. 21, 1905.
A. G., F. W. & E. A. HOEFER.
WIRE FENCE MACHINE.
APPLICATION FILED JAN. 17, 1905.
12 SHEETS—SHEET 8.
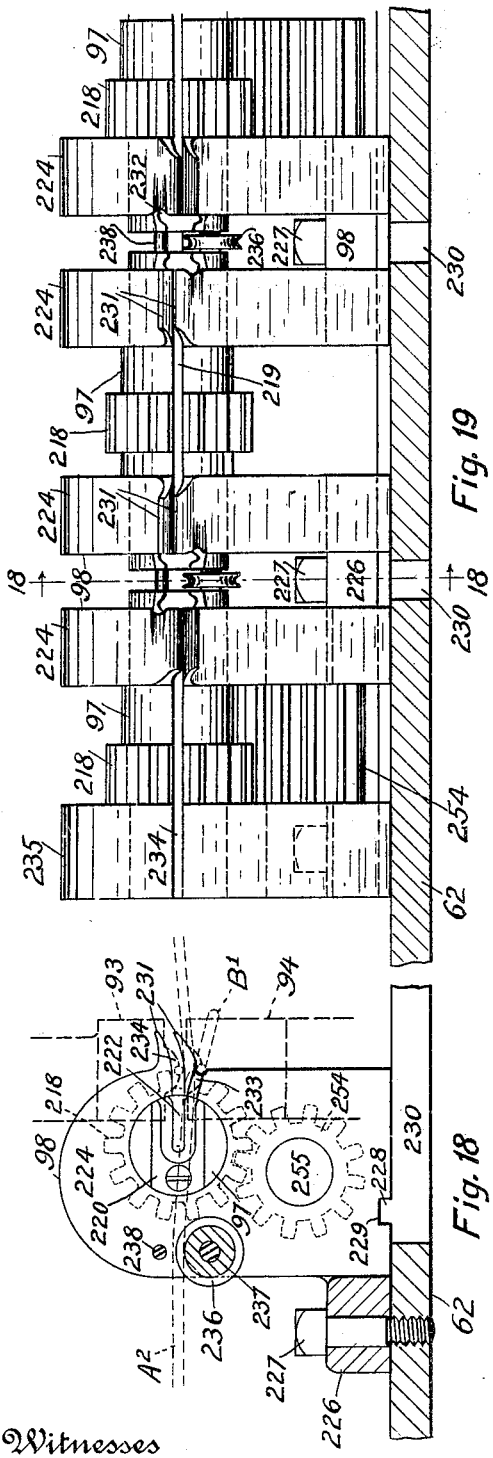
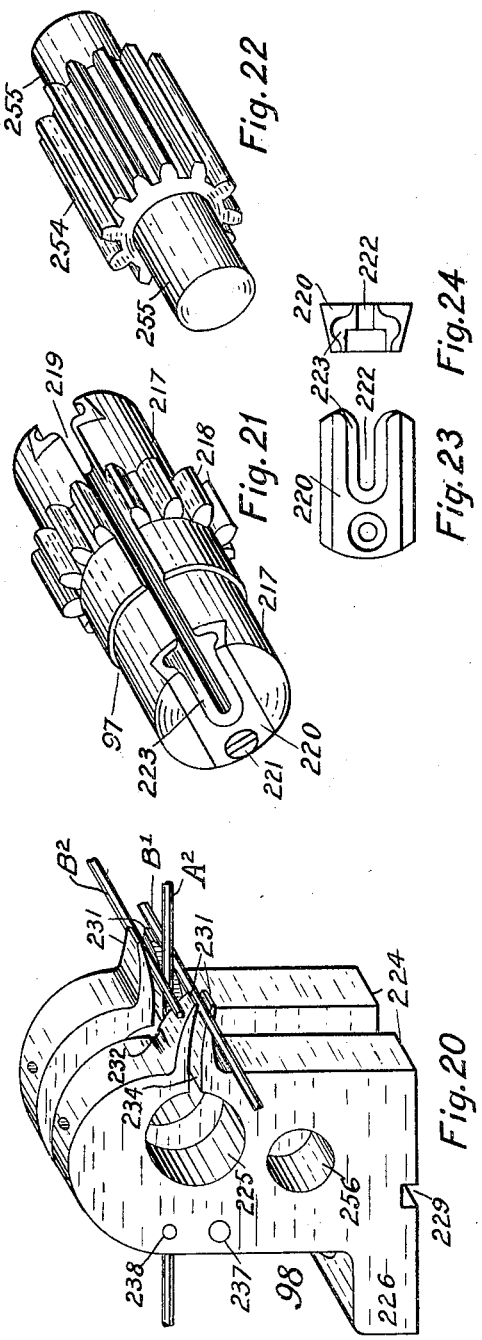
Witnesses
A. James Pauly
Pauline Welsch
Inventors
August G. Hoefer, Fred'k W. Hoefer,
and Emil A. Hoefer
By George Wetmore Colles
Attorney No. 804,846.
PATENTED NOV. 21, 1905.
A. G., F. W. & E. A. HOEFER.
WIRE FENCE MACHINE.
APPLICATION FILED JAN. 17, 1905.

12 SHEETS—SHEET 9.

Witnesses
A. James Pauly
Pauline Welsch

Inventors
August G. Hoefer, Fred'k W. Hoefer,
and Emil A. Hoefer
By George Wetmore Colles
Attorney No. 804,846. PATENTED NOV. 21, 1905.
A. G., F. W. & E. A. HOEFER.
WIRE FENCE MACHINE.
APPLICATION FILED JAN. 17, 1905.
12 SHEETS—SHEET 10.
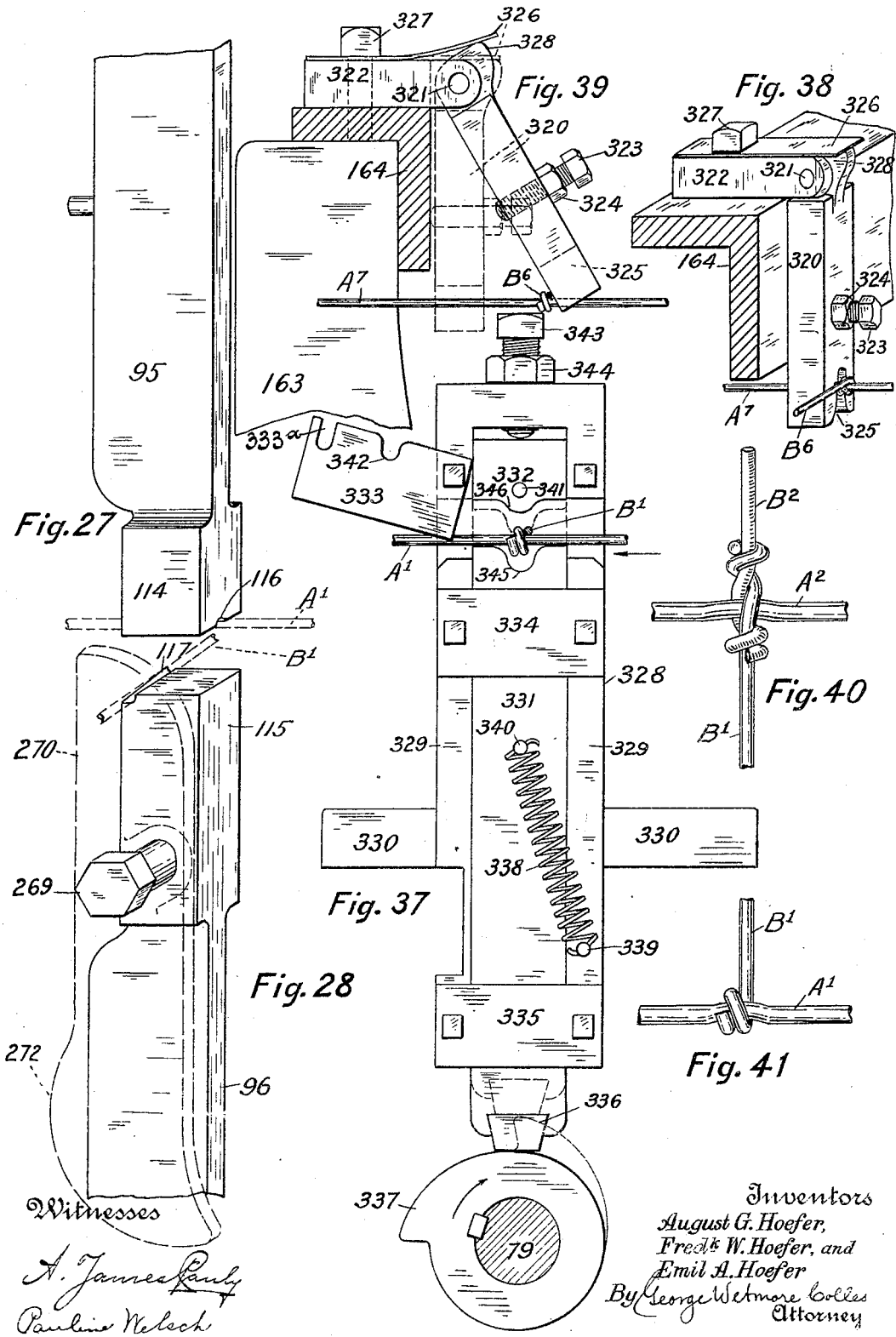
Witnesses
Inventors
August G. Hoefer,
Fred'k W. Hoefer, and
Emil A. Hoefer
By George Wetmore Colles
Attorney

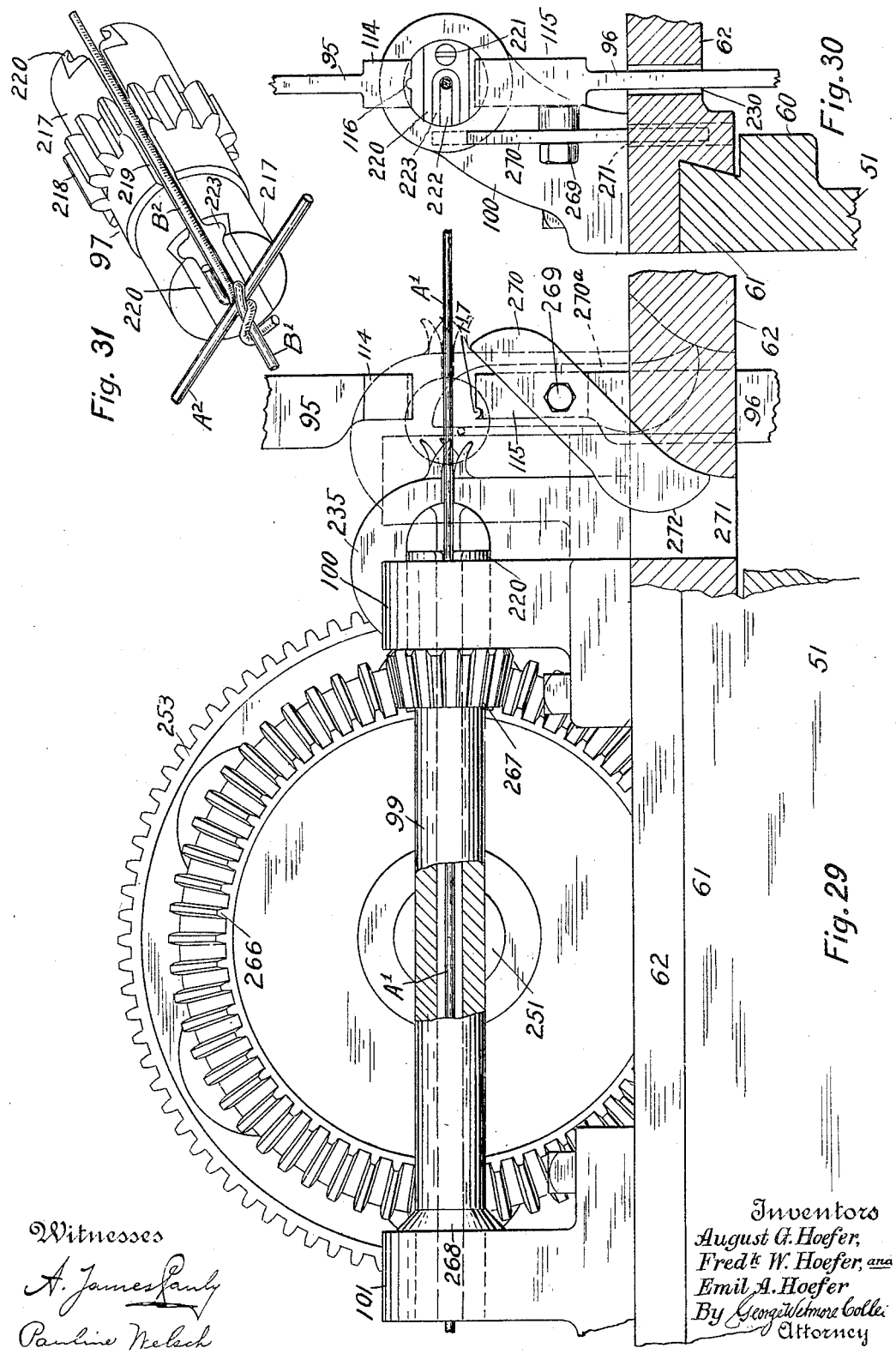

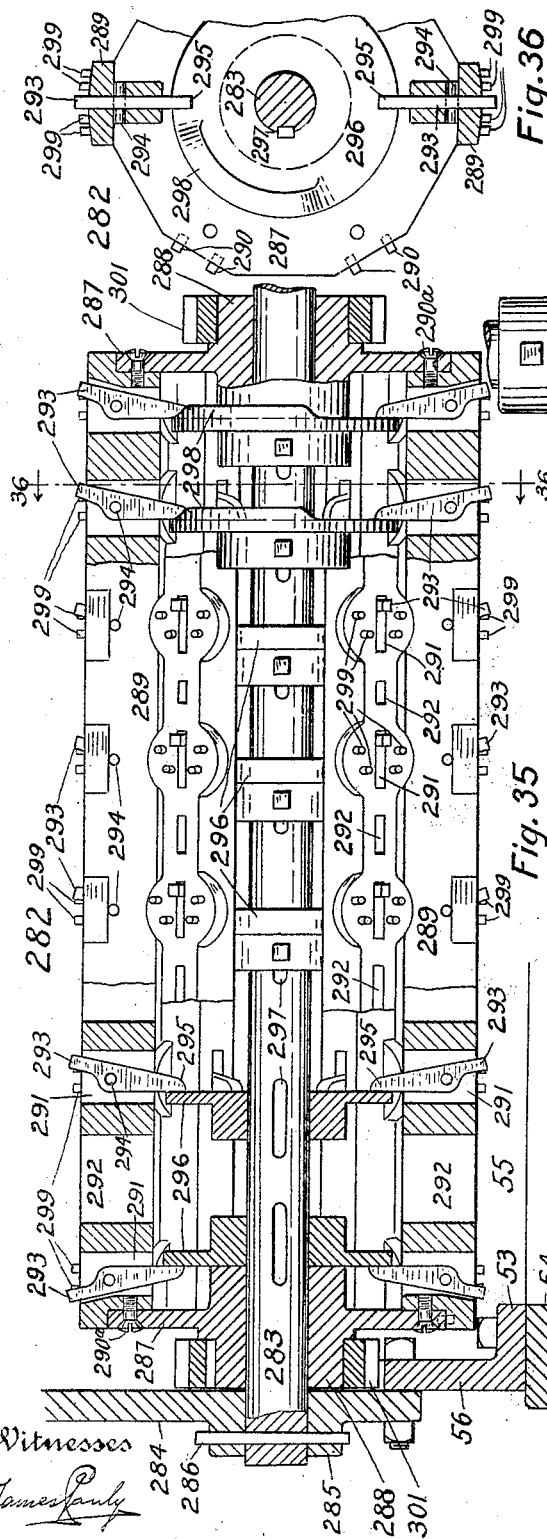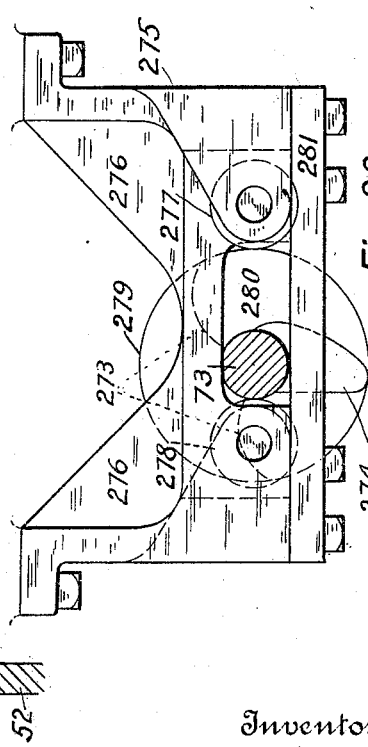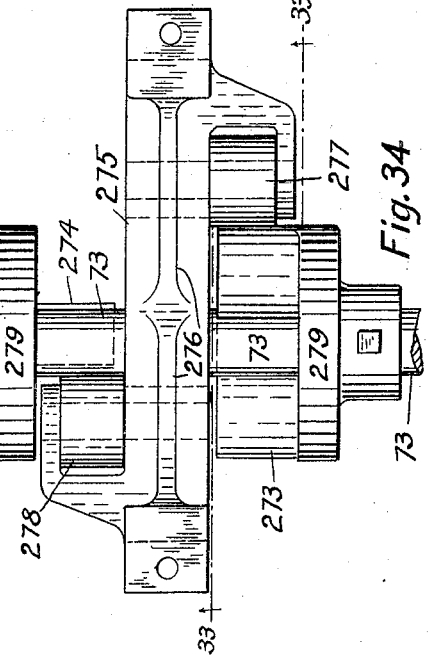

UNITED STATES PATENT OFFICE.

AUGUST G. HOEFER, FREDERICK W. HOEFER, AND EMIL A. HOEFER, OF FREEPORT, ILLINOIS, ASSIGNORS TO JANESVILLE BARB WIRE COMPANY, A CORPORATION OF WISCONSIN.

WIRE-FENCE MACHINE.

No. 804,846.  Specification of Letters Patent.  Patented Nov. 21, 1905.

Application filed January 17, 1905. Serial No. 241,493.

*To all whom it may concern:*

Be it known that we, AUGUST G. HOEFER, FREDERICK W. HOEFER, and EMIL A. HOEFER, of Freeport, Stephenson county, Illinois, have invented a Wire-Fence Machine, of which the following is a specification.

This invention relates to a device for manufacturing wire fences of that type known as "square-mesh"—that is to say, a fence having a series of parallel strand-wires running longitudinally and stay-wires connecting them transversely at intervals.

The object of our invention more particularly is to produce a machine capable of automatically making the wire fence patented by August G. Hoefer and described in his United States Patent No. 710,913, dated October 7, 1902. In this fence the stay-wires are compound—that is, each complete stay running from top to bottom of the fence comprises as many pieces of wire as there are intervals between the successive strand-wires—and the feature more particularly characterizing this fence is the manner in which the ends of adjacent stay-wires are connected together by coiling around each other with the strand-wire between them. Another important characteristic of this fence is the crimp or sharp bend which is put in the strand-wire at the point where it passes between the two stay-wires, whereby the stays are prevented from becoming displaced longitudinally on the strand-wires. For the form and characteristics of the fence we refer to the aforesaid patent. A further characteristic of the fence as manufactured by the machine herein described, but not referred to in said patent, is the crimp in the strands intermediate between each pair of stays.

The object, therefore, which we have in view is a machine adapted to evolve the finished fence from plain continuous wire without any previous or subsequent manipulation.

One of the main features of this invention resides in the manner of coiling the stay-wire ends, whereby certain important things are achieved—to wit, first, the ends of the wires are coiled by means of dies completely around each other without leaving any projecting end, as has been the case with fences hitherto made by reason of the imperfect coiling of such ends, and, secondly, the interlocking ends of two stays are coiled in opposite directions.

Another important feature used in connection with the coiler system is the means employed for holding the strands and stays in the process of coiling and putting the necessary crimp in the strand-wire by the same dies which hold the wire in the act of taking such hold of the wire.

Another important feature of our present machine resides in the novel means by which the stay-wires are cut off in their proper lengths and conveyed to the holding means above mentioned, this being done by one operation.

Still another feature of our improvement resides in our improved and simplified feed and crimping drum, whereby intermediate crimps between the stays are placed in the strand-wires, and at the same time the completed fence and strand are fed along through the machine.

Other novel features of our machine are the spacing mechanism for the stay ends or outside stay-wires, the crimping mechanism for the outside stay-wires, the means by which their proper movements are given to the various parts of the machine, and other subordinate constructions and combinations which will be hereinafter more fully described, and pointed out in the claims.

We have illustrated in the accompanying drawings our machine in its most approved form as adapted to a seven-strand fence, and it will of course be readily understood by those versed in the art how the machine is to be altered or amplified to produce a fence of any other number of strands.

Figure 2:
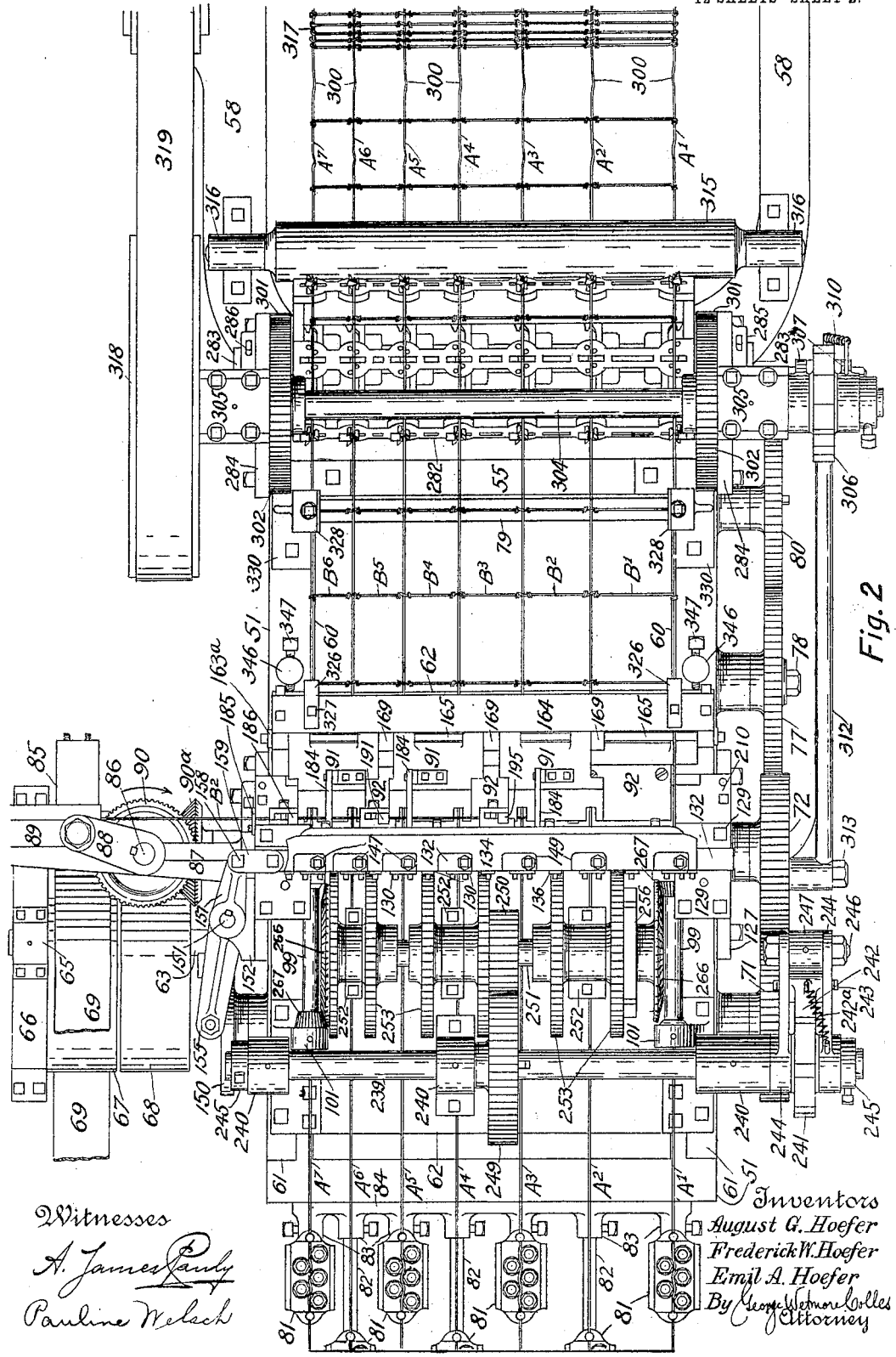
Figure 3:
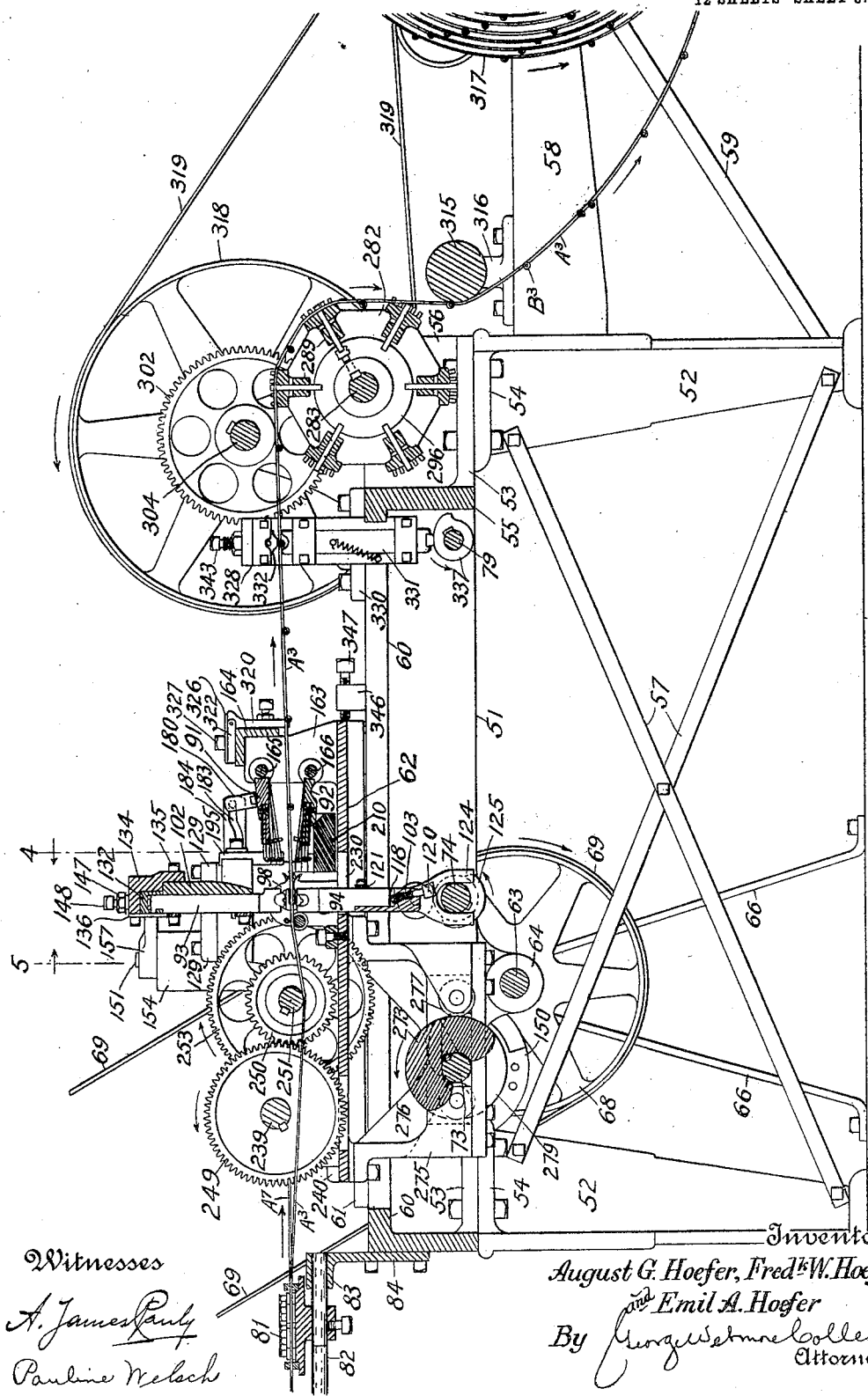
Figure 4:
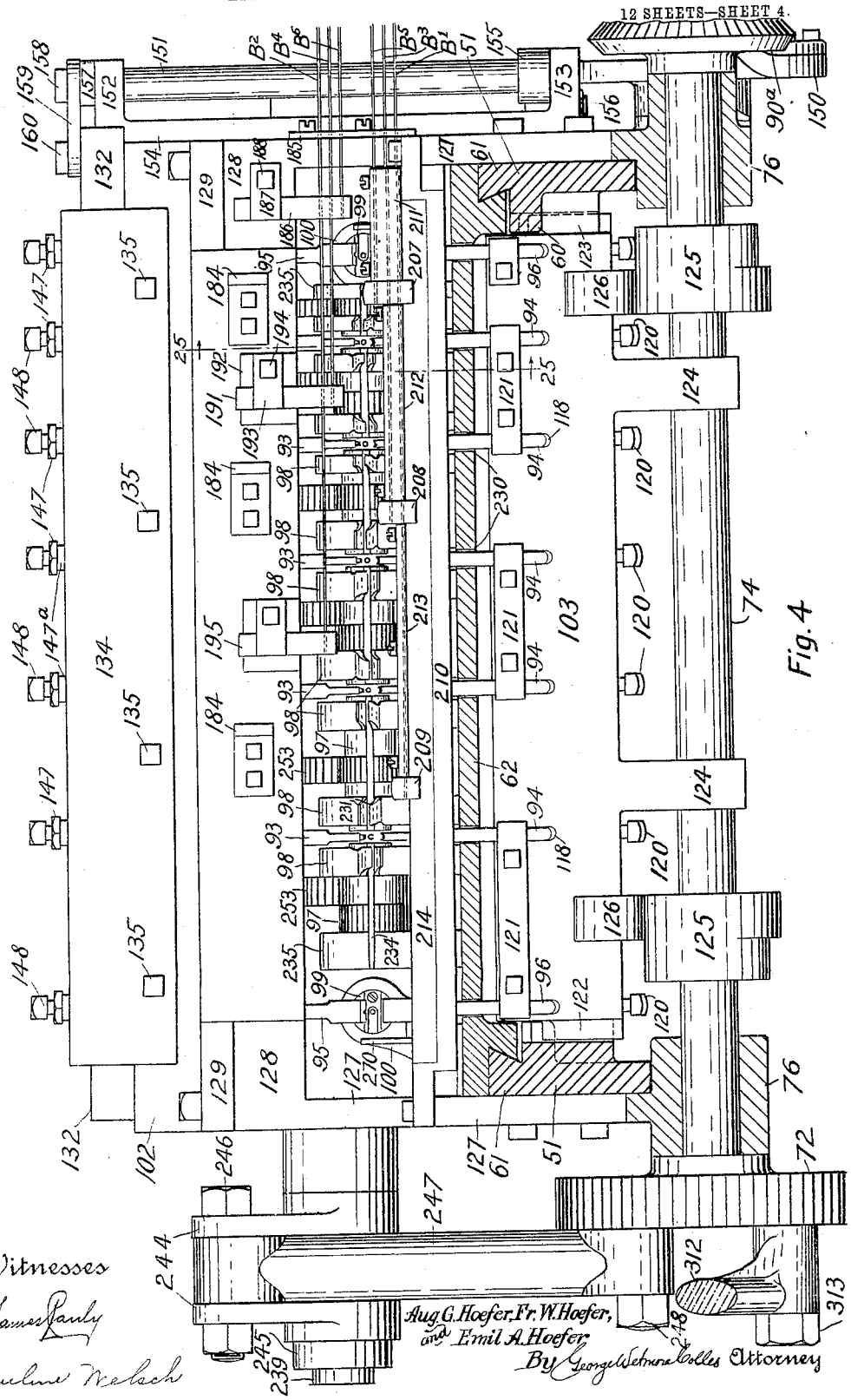
Figure 5:
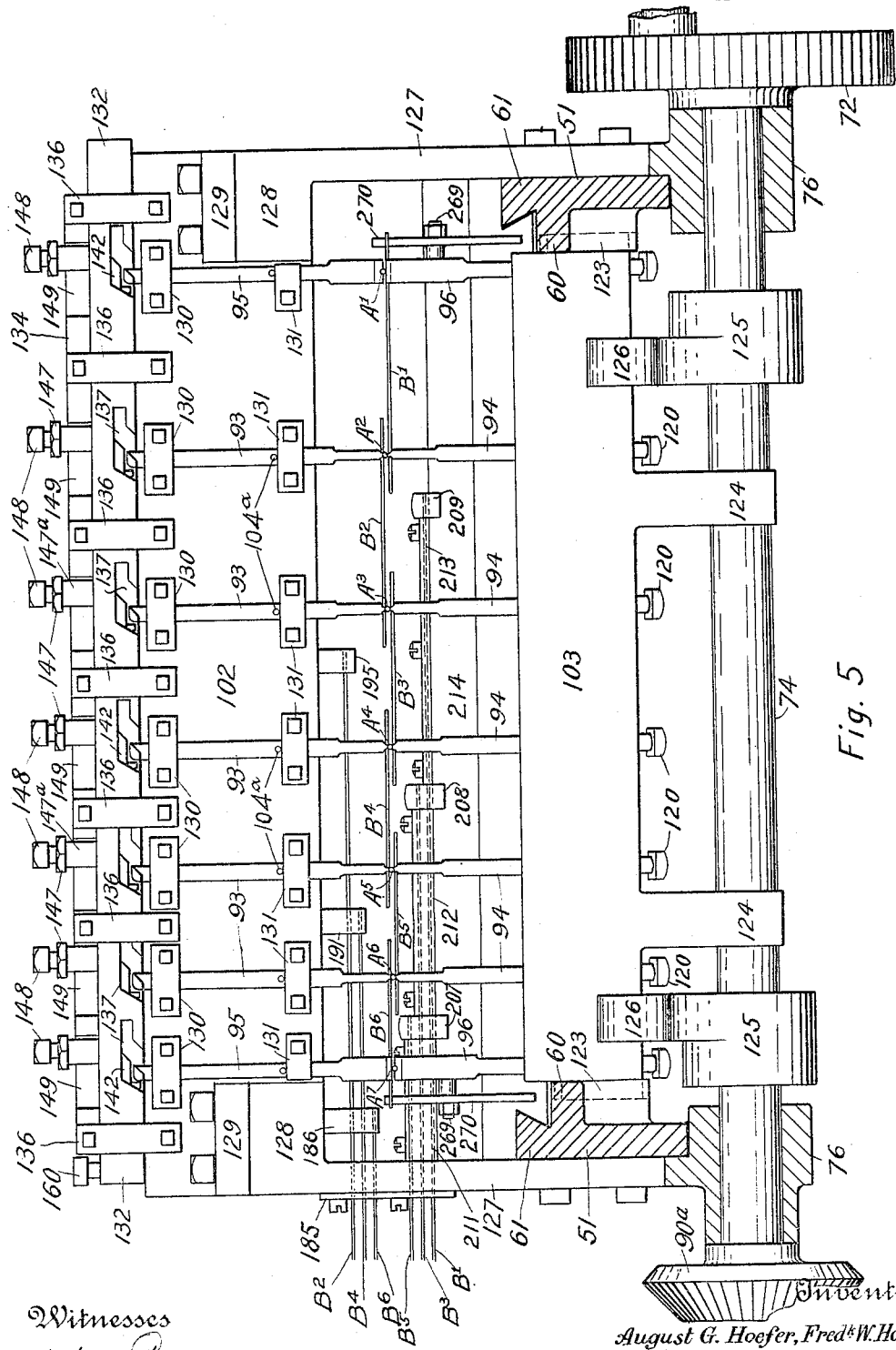
Figure 25:
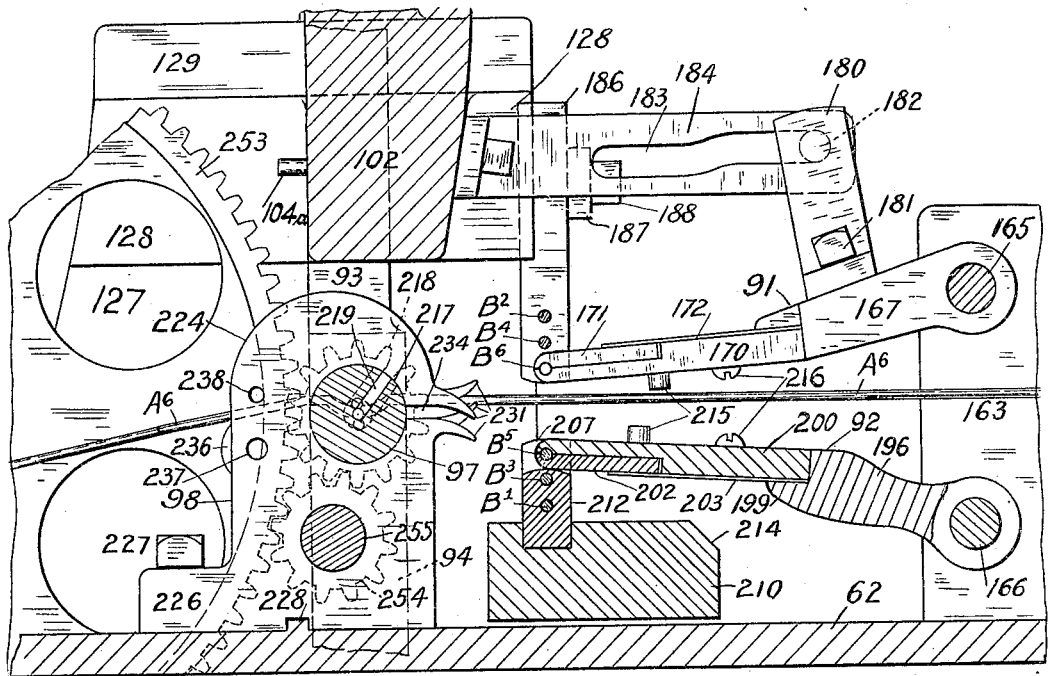
Figure 26:
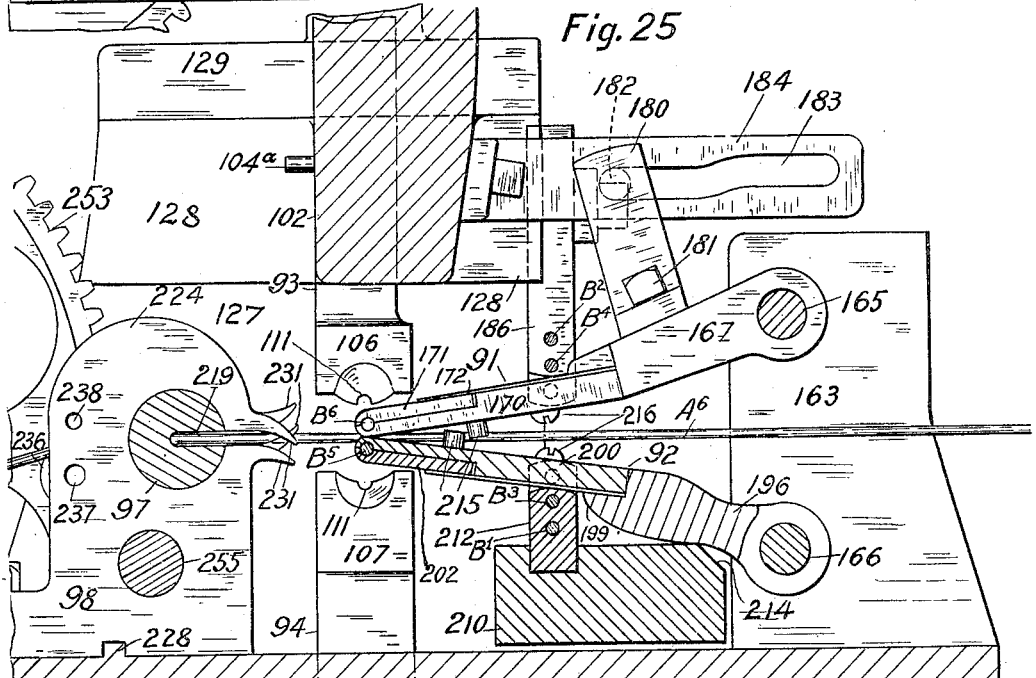

In the drawings, Figure 1 is a left side elevation of the machine. Fig. 2 is a plan view of the same. Fig. 3 is a longitudinal vertical section in the plane of the third strand-wire $A^3$ from the left—that is, from the top of the fence. Fig. 4 is a vertical transverse section looking from the front approximately on the line 4, Fig. 3, showing a front view of the head-block and die-carriage, the carriers being removed and the cams on the rear shaft omitted for the sake of clearness. Fig. 5 is a vertical section looking from the rear approximately on the line 5, Fig. 3, showing a rear view of the head-block and die-carriage, the carriers and other parts in the rear thereof being removed for the sake of clearness. Figs. 6 and 7 are respectively a fragmentary side elevation, partly in section, and a transverse section, both on enlarged scale, of the reciprocating cam-bar for the upper gripping-dies. Figs. 8 and 9 are perspective views of one of the upper and lower gripping-dies, respectively, for the intermediate strand-wires. Figs. 10 and 11 are respectively a side and an end view of the rear cam-shaft and parts mounted thereon. Figs. 12 and 13 are perspective views, on an enlarged scale, of a lower and an upper carrier, respectively. Fig. 14 is a vertical section through the upper carrier shown in Fig. 13 on the line 14 of that figure. Figs. 15 and 16 are perspective views, respectively, of the right-hand guide-block and the extreme right-hand cutting block or knife for the lower stay-wires. Fig. 17 is a perspective view of the extreme right-hand cutting block or knife for the upper stay-wires. Figs. 18 and 19 are respectively a transverse section on the line 18, Fig. 19, and a fragmentary front elevation, both on enlarged scale, of the coilers and coiler-blocks in position. Fig. 20 is a perspective view of one of the coiler-blocks, showing the stay-wires in the position which they occupy when the coiler-block advances to receive them. Fig. 21 is a perspective view of one of the coilers. Fig. 22 is a perspective view of one of the intermediate gears for the coilers. Figs. 23 and 24 are respectively a front and an end view of a coiler-die. Figs. 25 and 26 are fragmentary longitudinal sections of the machine, taken approximately on the line 25, Fig. 4, showing the coilers, carriers, and gripping-dies in two positions representing the extreme positions of the carriage. Figs. 27 and 28 are perspective views, respectively, of an upper and a lower gripping-die for the outside strand-wires. Fig. 29 is a side elevation from the left of the machine of a part thereof with the side post for the head-block removed and parts being shown in section to illustrate the mode of operation of the outside coiler. Fig. 30 is a front view of one of the outside coilers and the parts coöperating therewith. Fig. 31 is a perspective view of one end of a coiler, showing the operation of coiling a stay-wire end about the adjacent stay-wire. Fig. 32 is a side elevation of the locking-disk for the coilers and its dog, being a longitudinal section through the carriage in the plane of said disk. Figs. 33 and 34 are respectively a vertical longitudinal central section on the line 33, Fig. 34, and a plan view of the cam mechanism which gives motion to the carriage. Fig. 35 is partly a front elevation and partly a longitudinal axial section through the feed and crimping drum. Fig. 36 is a fragmentary transverse section through the same approximately on the line 36, Fig. 35. Fig. 37 is a side elevation of one of the crimpers for the outside strand-wires. Fig. 38 is a perspective view of a spacer for the outside stay-joints. Fig. 39 is a side view of the same, showing its action on the backward movement of the carriage. Figs. 40 and 41 are side views, respectively, of an intermediate and an outside stay-wire joint of the fence made by the machine, as described in the aforementioned patent and being here shown for convenience of reference.

Referring first to Figs. 1, 2, and 3, 51 is a rectangular frame mounted on legs 52 at the four corners thereof, said legs secured in place by internal flanges 53 and 54, Fig. 3. It will be noted from Fig. 3 that the transverse member 55 at the right-hand end of the frame (which is the delivery end and will herein be termed the "front" end of the machine) is not located at the extreme end of the frame 51, but at a point somewhat back of the end, leaving projecting flanges 56 for mounting the main feed mechanism. The whole is braced against endwise vibration by diagonal rods 57. At the front end a pair of brackets 58 are secured to the front legs 52 to support the winding drum or reel for the completed fence, said brackets being braced by rods 59. The frame 51 is provided with an internal marginal web 60 for the sake of strength and to give sufficient bearing-surface for the parts mounted on it.

On the upper side of the web 60 there is formed at the sides of the machine a pair of ways 61, on which slides a carriage 62. This carriage carries the coiling mechanism and has a front and rear reciprocating motion of about from two to three inches travel. Below the carriage 62 on the frame 51 is the driving-shaft 63 of the machine, which is mounted in bearings 64, secured on the frame 51, and an outboard-bearing 65, supported on legs 66, Figs. 2 and 3. On this shaft 63 are mounted fast and loose pulleys 67 68, on which runs the driving-belt 69, which communicates motion to all moving parts of the machine. A pinion 70 is mounted on the left-hand end of the shaft 63 and meshes with two gear-wheels 71 and 72, mounted on parallel shafts 73 and 74, which we will here term the "rear" and "intermediate" cam-shafts, respectively, these shafts being mounted to turn in boxes 75 and 76, bolted or otherwise secured to the side of the frame 51. (See Figs. 4, 5, and 10.) On the same sides of the frame 51 as the gears 71 and 72 is also mounted an idle gear-wheel 77 upon a stub-shaft 78, and this wheel meshes with and is turned by the gear 72, and in front of this is the front cam-shaft 79, which is likewise mounted in bearings on the frame 51 and has a gear 80 keyed thereto and meshing with and turned by the gear 77. As above stated and as seen from Fig. 2, the machine shown is a seven-strand-fence machine, the strands A passing through the machine longitudinally from rear to front—that is, from left to right in Fig. 2—and being numbered $A'$, $A^2$, $A^3$, $A^4$, $A^5$, $A^6$, and $A^7$, respectively, from top to bottom. Each stay B comprises six lengths of wire B', B², B³, B⁴, B⁵, and B⁶, whose adjacent ends interlock with each other and with the strands, as shown. (See Figs. 40 and 41.) The seven strand-wires A are derived from individual coils, bobbins, or reels placed at the rear of the machine, (and not herein shown, as they form no part of our invention,) and on its way to the machine each strand-wire passes through a straightener 81, adjustably mounted on a bar 82, each of these bars being fixed in a socket 83, formed on a plate 84, bolted to the rear of the machine or arranged in any other manner, these straighteners being common to all similar machines and forming no part of our present invention.

The six stay-wires B', B², B³, B⁴, B⁵, and B⁶, forming part of each stay B, are in like manner derived from six individual coils, bobbins, or reels of wire located at the right side of the machine and fed in by a suitable feed mechanism 85 in a direction at right angles with the strand-wires A and alternately above and below the latter, as will be seen from their position in end view in Figs. 1 and 3 or on a larger scale in Figs. 25 and 26 and in side view in Figs. 4 and 5. The feed mechanism 85 here shown is operated by means of a vertical shaft 86, mounted in the bracket 87 and having mounted on its upper end a crank 88, connected to the feed mechanism by a pitman 89 and on its lower end a miter-gear 90, meshing with its companion gear 90ᵃ on the end of the intermediate cam-shaft 74. This feed mechanism 85, however, forms no part of our present invention, as any feed mechanism adapted to accomplish the purposes of feeding the respective stay-wires into the machine in their proper respective lengths may be used. It is convenient in wire fences of this character to have the lower strand-wires closer together than the upper strand-wires, whereby small animals are prevented from going through the fence and a minimum amount of wire is used for any given height of fence, and in the fence here shown the distance of the respective strand-wires increases gradually from bottom to top, thus requiring a different length of stay-wire for each of the respective stay-wires B' to B⁶. Consequently the feed mechanism 85 should be such as to feed the proper length for each stay-wire individually at each cycle of the machine; but it is to be understood that we do not in any way confine ourselves to a fence having different lengths of stay-wires, as our machine is equally applicable to a fence having the strand-wires equally spaced. In this case the mechanism 85 would be so arranged as to feed the same lengths of stay-wire for all the stay-wires.

There are three principal parts of the machine which perform the function of cutting the stay-wire, conveying it to its place on the strand, and fixing it to the strands—to wit, first, the cutters and carriers, (designated 91 and 92, Figs. 1, 2, 3, 12, 13, 25, and 26,) the gripping and crimping dies 93 94, Figs. 3, 4, 5, 8, 9, 25, and 26, including also the end dies 95 96, Figs. 4, 5, 27, 28, 29, and 30, and the coiling mechanism comprising in its main parts the rotary coilers 97, mounted in coiler-blocks 98, Figs. 4, 18, 19, 20, 21, 25, 26, and 31, including also the end coilers 99, mounted in posts 100 101, Figs. 2, 4, 29, and 30. Of these the cutters and carriers 91 and 92 and the coiling mechanism are mounted to reciprocate on the carriage 62, whereas the upper gripping and crimping dies 93 are mounted to reciprocate vertically in the head-block 102, and the lower gripping and crimping dies 94 are mounted in a vertical reciprocating die-carriage 103, immediately over the intermediate cam-shaft 74, all as clearly shown in Fig. 3.

The function of the cutters and carriers 91 and 92 is to cut the respective lengths of said wires and convey them individually into their proper positions on the strands and between the gripping and crimping dies. The function of the gripping and crimping dies 93 94 is to grip the stay-wires and hold them in proper position on the strands ready to be coiled, and while the coilers advance by the motion of the carriage and coil the latter while further in the act of gripping these dies place the proper crimp in the strand-wires. The function of the coilers is to advance to receive the stay-wires as they are held in the gripping-dies and to coil their ends around each other and in the case of the end stay-wires to coil them about the outside strands. We will now proceed to describe these respective mechanisms, beginning with the gripping-dies, next the carriers, and lastly the coilers.

Although the upper and lower dies each have a vertical motion, their action is such that the motion of the upper dies is only for the purpose of freeing the joint after the coiling operation has taken place, while the lower dies are depended on to put the crimp in the wire. These dies are shown, respectively, in enlarged perspective views in Figs. 8 and 9. As will be seen both dies have a thickened shank 104 105 and a flattened lower and upper end, respectively, 106 107, which ends are of nearly the same thickness as the strand-wire. In the upper edge of the lower die 94 are formed a longitudinal groove 108, in which the strand-wire rests when held by the dies, and a transverse segmental notch 109, which is of the shape of the crimp to be placed in the strand-wire. Correspondingly the lower edge of the upper die 93 (which need not be grooved) has a segmental projection or knuckle 110, coöperating with and fitting into the notch 109, whereby to bend the strand-wire into said notch. The notch 109 and the knuckle 110 have, further, at their centers each a circular smaller notch 111, in which notches fit the two stay-wires which pass, respectively, above and below the strand at the center of the crimp, as clearly shown in Fig. 40. Furthermore, both sides of the flattened ends 106 107 of each die are hollowed out, as shown at 112 113, whereby to permit the coiling of the stay-wire ends to take place as closely as possible to the strand-wires.

The foregoing description of the dies applies only to those having an intermediate joint, inasmuch as the outside strands A' and A⁷ are connected with the stays B in a different manner—that is, by coiling the stay end around the strand-wire A' or A⁷, as shown in Fig. 41, Sheet 10. We therefore use for these outside joints a pair of differently-shaped dies 95 96, Figs. 27 and 28, those shown being for the dies on the extreme left of the machine, which have each a square end or head 114 115 and a longitudinal or transverse groove 116 117. In the case shown the longitudinal groove is in the upper die and the transverse groove in the lower die, because in this case the stay ends pass below the strand; but in cases where the stay passes above the strand—as, for example, on the opposite end of this machine—the position of these grooves will of course be reversed. These end dies do not perform any crimping operation, but simply act to receive the stay-wire from the carrier and transfer it to the coiler.

The lower dies 94 are mounted in slots 118 in the die-carriage 103, being provided with reduced lower ends 119, which fit in these slots, Figs. 3 and 9, and they are held therein by overlapping plates 121, bolted to the carriage, as shown. The die-carriage is provided with set-screws 120, Figs. 3, 4, and 5, passing up from beneath and abutting on the lower ends of the dies 94, whereby they may be individually adjusted to the position of the respective strand-wires beneath which they are respectively mounted. The die-carriage 103 has at its ends slides 122, which travel in vertical ways 123, formed by lugs at the sides of the frame 51, one of these lugs (that at the left) being shown in section in Fig. 4. The carriage 103 has further to assist in steadying it, a pair of depending forks 124, Figs. 3, 4, and 5, which embrace and slide on the cam-shaft 74. The latter in turn is provided with a pair of cams 125, on which rest rollers 126, mounted on the die-carriage 103, and said cams cause the carriage to be raised and lowered at the proper times. The vertical motion of the die-carriage is but very slight (about a half-inch) just sufficient to enable the dies to certainly release the joint after the coiling operation, and it is not absolutely essential to our invention that this die-carriage and the movable lower dies should be used, as it would be possible to use the machine with stationary lower dies or with other means for freeing the joint from the dies, or if, on the contrary, the upper and lower dies are reversed in position the upper dies might then be made stationary; but we prefer to have both sets of dies movable, as this is found to be important for the smooth operation of the machine.

Referring next to the mounting of the upper dies, this will be best seen in Figs. 4 and 5, which present, respectively, a front and rear view of the same. On the sides of the frame 51 are secured upright plates 127, each of which has an enlarged head 128 at its upper end on which rest the two ends of the head-block 102, the latter being provided with bolting-flanges 129 for this purpose. The head-block has a series of vertical grooves or channels which receive the shanks 104 of the upper dies 93, and the latter are held in place in these channels by means of plates 130 131 overlapping them at top and bottom and bolted to the head-block, as shown. A stop-pin 104ª is inserted in the rear edge of the shank 104 of each upper die to prevent it from falling out when the head-block is being set up. On the top of the head-block 102 is mounted a reciprocating cam-bar 132, which operates the dies 93. This bar is shown in enlarged detail in Figs. 6 and 7 and, as shown, is of approximately square section and is provided with an approximately square channel 133 in its lower side, extending the entire length of the bar. This bar is held in position on the head-block by means of an angular piece 134, Figs. 1, 3, 4, and 5, extending over its front and top side and bolted to the head-block by cap-screws 135, and the bar 132 is retained against rearward displacement by strap-plates 136, overlapping it at intervals and secured to the rear face of the head-block 102 and the rear edge of the angular piece 134, as clearly shown in Fig. 5. The cam-bar 132 has farther in its rear wall a series of undercut notches 137, Figs. 5 and 6, forming at the right of each notch a projecting finger 138, which has an oblique upper edge 139, and each of the upper dies 93 has in like manner a notch 140, cut in the rear edge thereof near the top and provided with an oblique surface 141, which coöperates with the finger 138, the latter passing into the notch 140 when the bar 132 is moved to the right (the left in Fig. 6) and raises the die into its upper position in the slot 137, as shown by the dotted-line position 93ª, Fig. 6.

At the left of each notch 137 is mounted a small auxiliary cam-block 142 of rectangular form, pivoted on a pin 143, extending across the channel 133, as shown, so that the right-hand end of the block 142 has a slight vertical movement, and a pin 144, projecting from its lower side, is provided to limit this movement in a downward direction. This block 142 has an oblique edge 145, parallel to the edge 139 and so shaped as to allow just sufficient room for the projecting part 146 of the die 93 above the notch 140 to pass through between the block 142 and finger 138. It will be understood that the block 142 is provided for the purpose of the individual adjustment of each of the dies 93, for it is found that unless this is done the upper and lower dies do not properly grip the wires, some being only loosely held and others being compressed too tight. Over the free end of each block 142 a screw-threaded hole is formed in the bar 132 and a set-screw 148 fitted thereinto, as shown, by means of which the position of the block 142 is adjusted until it presses just sufficiently upon the head of the die 93 to cause it to grip its wires properly. The set-screw 148 is provided with a jam-nut 147, which by an interposed sleeve or washer 147$^a$ is raised above the top of the angular member 134 for convenience of manipulation. By reference to Figs. 2 and 5 it will be seen that the angular piece 134 has rectangular notches 149 cut therein to receive the respective set-screws 148 and to allow them each to reciprocate with the bar 132, to which they are attached.

The means for reciprocating the cam-bar 132 comprise a cam 150, mounted on the right-hand end of the rear cam shaft 73 and shown in detail side and front view in Figs. 10 and 11; a vertical rock-shaft 151, Figs. 2 and 4, mounted in bearing-lugs 152 153, formed on an upright base-plate 154, Figs. 3 and 4, secured to the side of the frame 51; a lower rock-arm 155, fixed to the shaft 151 and carrying at its end a cam-roller 156, and an upper rock-arm 157, extending forwardly and having a pin 158, which connects by a link 159 with a pin 160, mounted on the right-hand end of the bar 132. (See Fig. 4.) The cam 150 comprises a disk keyed to the shaft 73 and having two marginal arcuate notches 161 sufficiently deep to allow the cam-roller 156 to pass through, and fingers 162, projecting from either side of the disk and in the direction of motion, so as to hook over the roller 156 and cause it to pass from one side of the disk to the other and back at each revolution of the shaft 73, thus giving to the shaft 151 an oscillating and to the bar 132 a reciprocating movement, as required, whereby the upper dies are raised and lowered simultaneously in the manner already described.

I will next describe the cutters and carriers which cut off the lengths of stay-wire and convey them to the dies. Mounted on the front end of the carriage and on either side thereof is an upright post 163, Figs. 1, 3, 25, and 26, the ends of the two posts being united by an angle-bar 164 for the sake of strength and also to carry the spacers 320, as will be hereinafter described. These posts serve as supports for a pair of transverse stationary axles 165 166, which are passed through holes in the posts and held against endwise displacement by plates 163$^a$, covering their ends. On the axle 165 are mounted the upper carriers 91 and on the axle 166 the lower carriers 92. These carriers are shown in perspective in Figs. 12 and 13. Each of the upper carriers 91 comprises a plate 167, provided with bearing-lugs 168, which turn on the shaft 165, and the carriers are held in proper position longitudinally on this shaft by the bearing-lugs 169 on the bar 164, which support the shaft at intermediate points of its length. As shown in Fig. 2, there are three of these upper carriers. The plate 167 has its rear portion recessed to receive the active parts of the carrier, which comprise a fixed jaw 170 and a movable jaw 171. The jaw 171 is attached to the spring-plate 172 by means of rivets 173, and this plate is in turn secured, together with the fixed jaw 170, in the recessed portion of the plate 167 by rivets or screws 174. Each jaw has formed in its extreme outside end a semicylindrical groove, the two coöperating to form a cylindrical bore 175 of the same diameter as or slightly less than that of the stay-wire, which is pushed thereinto from the right-hand end of the feed mechanism 85. (The entering end of the bore should be somewhat enlarged to facilitate pushing in the wire.) The two jaws are, furthermore, transversely notched near each end, as shown at 176, these notches being opposite the gripping-dies, and in order to admit these dies to a position where their central notches 111 are in line with the stay-wire when held in the bore 175. It will be seen that when the dies grip the wire and the carriage retires the spring-plate 172 enables the upper jaw to release the wire, which is pulled from the carrier by the gripping-dies. In order to hold the wire in the bore 175 more securely, we may provide a light subsidiary spring 177, riveted at 178 to the upper jaw and projecting through a recess 179 into the bore 175, as clearly shown in Fig. 14, thus holding the wire securely and preventing endwise motion, which might otherwise take place. It is to be understood, however, that this spring 177 is not an essential part of the carrier, but merely an auxiliary, which may be omitted in some cases.

On the plate 167 of the carrier 91 is mounted a post 180, secured thereto by bolts 181 and having a horizontally-projecting pin 182, which runs in the cam-slot 183, formed in a forwardly-projecting bar 184, secured to the head-block 102. The form of the cam-slot is such that when the carrier is moved forward by the motion of the carriage it is raised until the bore 175 comes opposite the end of its respective stay-wire B as the latter is fed into the machine, while when the carrier is moved back by the backward motion of the carriage it is lowered until the stay-wire in the two notches 176 rests upon the strands and is in position directly in the center line of the gripping-dies.

On the right-hand plate 127, which supports the head-block, is secured a guide-plate 185, which projects over the edge of the plate 127 and has therein six holes corresponding to the proper positions of the stay-wires B' to B⁶, which pass therethrough, as shown. (See Figs. 4 and 5.) On the enlarged head 128 of the right-hand plate 127 is also mounted a cutting block or knife 186, being secured by means of an overlapping plate 187 and cap-screw 188. This knife has three holes 189 therein in line with the respective upper stay-wires $B^2 B^4 B^6$, which pass therethrough, as shown. A perspective view of the block is shown in Fig. 17. The cutting-block 186 is positioned close to the right-hand edge of the corresponding carrier 91, and the latter has a shear-blade 190 set in the edge thereof, which coacts with the cutting-block 186 to cut off the wire in the plane of division between the cutting-block and shear-blade when the carrier is moved backward to convey the length of stay-wire so cut off between the gripping-dies, as aforesaid. In the same manner the next adjacent carrier 91 has mounted adjacent thereto a cutting-block 191, secured upon a lug 192 on the head 102 by an overlapping plate 193 and cap-screw 194, said cutting-block 191 having two holes therein, through which pass the remaining two stay-wires $B^2 B^4$, and the third and last carrier 91 has similarly coöperating therewith a cutting-block 195, mounted in the same manner as the block 191 and having but one hole therethrough, through which passes the remaining and extreme left-hand upper stay-wire $B^2$. It will be understood, of course, that for a fence of more than seven strands there will be a correspondingly greater number of upper carriers and cutting-blocks arranged in a similar manner.

The lower carriers 92, like the upper carriers, comprise a plate 196, having bearing-lugs 197 positioned on the lower carrier-shaft 166, said plate having also a shoulder 198, forming an abutment for the other parts, and a flange 199; a fixed jaw 200, secured to the flange 199 by screws 201; a movable jaw 202, riveted to a spring-plate 203, which plate is clamped between the jaw 200 and the flange 199, the two jaws being provided at their free ends with grooves coöperating to form a cylindrical bore 204, which fits the stay-wire, and transverse notches 205 to receive the gripping-dies, and a shear-blade 206, set in a recess in the right-hand edge of the jaws, as shown, which coöperates with one of the cutting-blocks 207 208 209, Figs. 4 and 16, which are arranged adjacent to the edges of the respective carriers and set in grooves in a bar 210, transversely arranged on the frame and supported at its ends upon the plates 127, Figs. 1 and 4. The cutting-blocks 207, 208, and 209 are further supported by guide-blocks 211, 212, and 213, which have respectively three, two, and one longitudinal bores therein in line with the lower stay-wires $B^5 B^3 B'$, respectively, and into which these pass and through the holes in the cutting-blocks 207, 208, and 209 into the bores 204 of the respective carriers. The bar 210 has a chamfered edge 214, against which the flange 199 strikes when the carriage retires, thus causing the carrier to be raised and the lower surface of the plate 196 to rest upon the bar 210, the plate 196 being so cut that this will cause the carrier to be raised into position to bring the stay-wire carried by it immediately under the strands which it crosses these strands passing partly into the notches 205, as shown in Fig. 26.

It will be understood that a spring is provided for the lower carrier, similarly placed to the spring 177 in the upper carrier, but on the lower side thereof, and it is not therefore seen in Fig. 12, which is a view from the upper side. Again, projecting pins 215 are provided just back of the notch 205 to steady the strand-wire laterally when the gripping-dies are brought together upon it, these being on the upper side of the lower carrier and the lower side of the upper carrier, Figs. 12, 25, and 26. A screw 216 is employed to hold the shear-blades 190 206 in place, this being also on the lower side of the upper carrier, and therefore not visible in Fig. 13. It should be remarked, further, that the carrier shown in Fig. 12 is that on the left-hand side of the machine, corresponding to the stay-wire B', and the different character of the outside gripping-dies makes it impossible, as well as unnecessary, to prolong the jaws so as to surround both sides of the end dies, thus leaving but one notch 205 in this case.

The coiling mechanism comprises a series of coilers 97, a row of blocks 98, supporting the coilers, and mechanism for rotating the coilers through two or more complete revolutions intermittently. One of the coilers is shown in perspective view in Fig. 21 and comprises a short shaft having journals 217 formed on its ends and a gear-pinion 218 in the middle. The shaft has a radial slit 219 from the center to the periphery between two of the teeth of the pinion 218, and a coiler-die 220, Figs. 23 and 24, is fitted in a dovetailed diametral recess formed in one or both ends of each coiler and secured therein by a screw 221. The coiler-die, like the shaft, has a radial slit 222, into which passes the stay-wire about which the adjacent stay-wire end is to be coiled, and around the slit 222 the die is recessed, as at 223, in a suitable manner to receive and hold the bent-over end which is to be coiled about the wire passing through the slit.

Each of the blocks 98 comprises twin posts 224, having bearings 225 therein, which receive the ends of the coilers, the latter projecting a slight distance within the space between the two posts 224 of each coiling-block. It will be understood that every coiler is journaled in two adjacent posts of adjacent blocks, and the blocks themselves are provided with rearwardly-projecting lugs 226, which are bolted to the platform of the carriage 62 by cap-screws 227, Fig. 18. The platform of the carriage is, furthermore, preferably provided with a transversely-extending rib 228, which engages a groove 229, formed in the base of each block 98, whereby the coilers can be quickly adjusted into proper alinement. The platform of the carriage has further a plurality of longitudinal slots 230 therein, through which pass the lower gripping-dies, and the several blocks 98 are centrally located with respect to the slots, gripping-dies, and strand-wires, whereby the strand-wires and dies readily pass between the projecting ends of two adjacent coilers, carrying with them the stay-wires which are being held, as shown by the dotted lines in Fig. 18. The twin posts 224 have each a slit 234 in its forward side and a pair of forwardly-projecting lips 231 on the margins of the slit, which are alined in the same horizontal plane as the strand-wires; but one pair of lips are bent up, so as to receive between them a stay-wire which passes over the strands, and the next adjacent pair are bent down, so as to receive between them a stay-wire which passes under the strands when the carriage is advancing. The respective positions of the strands and overlapping stay-wire ends at this epoch of the cycle are clearly shown in Fig. 20. It will be observed that the necessary consequence of the further advancement of the carriage and coiling-blocks beyond the position shown in this figure is the bending over of the two overlapping ends, one of which passes over the downwardly-bent lips 231 of one post 224 and the other under the upwardly-bent lips 231 of the other post 224. At the base of the upper lip on the post having the downwardly-bent lips there is formed a groove 232, Figs. 19 and 20, so that the projecting end of the wire $B^2$ is bent over at right angles in striking this groove and passes into the recess 223 of the coiler-die immediately behind it, while, on the other hand, at the base of the lower lip on the post 224, having the upwardly-bent lips, there is formed a similar groove 233, and when the projecting end of the wire $B'$ strikes this point it is bent over at right angles and passes through this groove into the recess 223 on the opposite coiler, all as clearly indicated by the dotted lines in Fig. 18. During this time it will be understood that the coilers are in such position that their radial slits 219 register exactly with the slits 234 between the two lips of each post, so that the stay-wires are smoothly guided by these lips into axial position within the coilers. When so located and still held firmly by the gripping-dies, each coiler is given two complete revolutions, whereby each bent-over stay-wire end within a recess 223 of the coiling-dies is wrapped firmly about the shank of the stay-wire passing through that die. The operation of coiling is clearly shown in Fig. 31, which is a perspective view of the coiler, showing the stay-wire $B^2$ passing through it and the end of the stay-wire $B'$ partially coiled about it.

It will be observed that as the stay-wires pass alternately over and under the strands the adjacent posts 224 of each pair of blocks 98 have their lips turned in the same direction and each pair is turned alternately upward and downward, as clearly displayed in Figs. 4 and 19. Also it is to be observed that the end block 235 has no lips 231, as there is no end to be bent over or to be coiled at this point; but the outside stay-wire ends are, as above mentioned, coiled about the outside strands by special mechanism hereinafter described.

On each coiler-block 98 is mounted, between the two posts 224, a grooved guide-sheave 236 on a pivot-pin 237, and with said sheave co-operates another pin 238, immediately over the strand-wire, to keep the latter in its proper position passing through the axis of the coilers.

The mechanism for rotating the coilers consists, primarily, of a main shaft 239, mounted in bearings 240 on the carriage 62 and having on its end a ratchet-wheel 241, with which engages a pawl 242, pivoted on a pin 243, mounted in a double rock-arm 244, which itself is loosely pivoted on the end of the shaft 239, as shown in Figs. 1 and 2. A spring $242^a$ is preferably used to hold the pawl in contact with the ratchet-wheel, and collars 245 are secured on the end of the shaft to hold it against endwise play. On the end of the double rock-arm 244 is a pivot-bolt 246, on which is journaled a pitman 247, whose lower end is pivoted on a crank-pin 248, projecting from the face of the gear-wheel 71. At or near the center of the main shaft 239 is keyed a gear-wheel 249, which meshes with a pinion 250 on a parallel counter-shaft 251, which is also mounted on the carriage 62 in bearings 252, secured thereto. Holes are provided in the bearing-blocks 240 252 wherever necessary to permit the passage of the strand-wires immediately beneath the shafts 239 251.

On the shaft 251 are also mounted a series of gear-wheels 253, one opposite each coiler, therefore six in number in this machine. Each gear-wheel drives one of the coilers, either directly by intermeshing with the teeth of the pinion 218, formed on the coiler, or indirectly through the medium of a reversing-pinion 254, which has journals 255 on its ends turning in bearing-sockets 256 in the coiler-blocks. One of these reversing-pinions is shown in perspective in Fig. 22. It will be understood that it is necessary, or at least desirable, that alternate coilers be revolved in opposite directions, and for this purpose every alternate coiler 97 is provided with a reversing-pinion 254, which meshes with the pinion 218 of the coiler and with the gear-wheel 253, thereby reversing the direction of the coiler with respect to the remaining coilers, which mesh directly with the wheels 253.

The transmission of motion from the shaft 73 must be such that the coilers make a complete number of turns, so that they shall always come to rest when the slits 219 are in register with the slits 234. In this machine the ratchet-wheel 241 has six teeth, and the ratio of the diameters of the gear-wheel 249 and pinion 250 is two to one, so that the shaft 251 makes at each cycle of the machine one-third of a revolution. The gears 253 having a diameter six times that of the pinions 218, the coilers will accordingly be revolved through two revolutions at each cycle of the machine. In like manner by suitably adjusting the gear ratio the coilers might be made to perform at each cycle one, three, or more complete revolutions, according to the number thought desirable.

In order to bring the slits 219 of the coilers into exact registry with the slits 234 of the coiler-block with unfailing certainty and to hold them there until the next coiling operation, we provide a locking mechanism, which is shown in detail in Fig. 32 and comprises a disk 256, keyed upon the shaft 251 and having triangular notches 257 therein spaced at distances around the circumference equal to the angle through which the shaft is turned at each coiling operation. With these notches engages the projecting end 258 of a locking-dog 259, which is pivoted at 260 upon a member 261, having depending pivot-lugs 262, passing through a slot 263 in the platform of the carriage 62 and secured thereto by cap-screws 264. The locking-dog 259 is acted on by a cam 265, keyed upon the shaft 73 in such manner as to raise the dog into engagement with one of the notches 257 at the moment the shaft 251 comes to rest and to hold it there during the backward-and-forward motion of the carriage and until the moment when the stay-wires are in place in the coilers and the latter are about to perform another coiling operation.

The mechanism for coiling the outside stay-wire ends is illustrated in side and front view in Figs. 29 and 30, which show the mechanism at the left side of the machine. On the extreme ends of the shaft 251 are mounted a pair of beveled gears 266, which mesh with beveled gear-pinions 267, formed on the end coilers 99, each of these latter being, as shown, in the form of an elongated tube, through the center of which the strand-wire passes, said tube turning in the posts 100 and 101 and being provided at the end opposite from the pinion 267 with a shoulder 268, which prevents endwise movement of the coiler. The forward end of the coiler projects slightly beyond the face of the post 100 and has a coiler-die 220 mounted in a recess therein, all exactly as previously described for the intermediate coilers 97. The position of this coiler-die when the coiler is at rest is, as shown in Fig. 30, such that the radial slit 222 thereof projects horizontally and outwardly. On the head 115 of the lower die 96 is mounted a cap-screw 269, which forms a pivot for the presser-finger 270, whose lower end projects into a vertical slot 271, cut in the platform of the carriage 62, as clearly shown in Fig. 29, the ends of this slot being so positioned as to tilt the upper end of the finger 270 backward by striking against its lower end upon the backward movement of the carriage, whereby to cause the upper end of the finger to be lowered to permit the stay-wire end to be inserted between the two dies 95 96 by the carrier 92, while on the forward movement of the carriage the rear end of the slot 271 strikes against the heel 272 of the finger and turns it into the position indicated by the dotted lines 270$^a$ in Fig. 29, wherein it presses against the stay-wire end, which is at this moment released by the dies 95 96 and forced into the recess 223 of the coiling-die. This recess being slightly hooked or undercut, as shown in Fig. 24, holds it during the coiling operation and causes it to be completely coiled about the strand-wire A' or A$^7$, leaving no projecting end, as is invariably the case with pin-coilers.

It will be understood that the end coiler on the right-hand side of the machine is precisely similar to that of the left-hand side, the positions of the pinion 267 and shoulder 268 being merely reversed to secure the proper direction of rotation.

The mechanism adopted for conveying the proper motion to the carriage comprises two cams 273 274, keyed upon the shaft 73 immediately under the carriage 62, as shown in Fig. 10, and a depending yoke 275, Figs. 3, 33, and 34, bolted to the under side of the carriage-platform and having diagonal strengthening-webs 276. Upon this yoke and upon opposite sides and ends thereof are mounted two cam-rollers 277 278, which engage with the cams 273 274, respectively, the former of which acts to advance and the latter to retire the carriage by striking the rollers 277 and 278 at the proper times. Each of the cams 273 274 has a strengthening-flange 279, and the yoke 275 has a recess 280 therein, which, with a plate 281, bolted to the bottom of the yoke, forms a slot embracing the shaft 73. We wish it understood, however, that we do not confine ourselves to this particular form of the yoke 275 nor to this particular mechanism for transmitting motion to the carriage, for it will be obvious to those skilled in the art that many such ways may be devised which will fulfil the same function.

The means by which the strands and the completed fence are fed through the machine comprise a drum 282, mounted on a stationary axle 283 at the front end of the machine, as shown in Figs. 1, 2, and 3. The drum and its mountings are exhibited on a larger scale in Figs. 35 and 36. To the sides of the flanges 56 of the frame are bolted upstanding plates 284, each of which has a boss 285 to receive the axle 283, which is keyed therein by the cotter-pin 286, driven diametrically through a hole in the end of the shaft. The drum 282 is made up of end plates 287, having hubs 288, which turn upon the axle 283, and a number of bars 289, parallel to the axle and equally spaced about the drum, said bars being secured to the end plates 287 in any suitable manner, as by dowels 290 and screws 290ª. In the drum as here constructed there are six of these bars 289, spaced at angles of sixty degrees with respect to each other, two of them being removed in Fig. 36. Over the drum so formed the fence passes, and the peripheral spacing of the bars 289 is such that the length of fence from one to the next is equal to the spacing of the stays, or one-half, one-third, &c., of that spacing. In the present case it is six inches, the machine being designed for a stay-spacing of six or twelve inches.

Each bar 289 has formed therein a plurality of longitudinal slots 291, equal in number to the number of strands, and one slot being below each strand as it passes over the drum. (The other slots 292 shown between the slots 291 are merely to save unnecessary material.) In each slot 293 is mounted a crimping-lever 291 upon a pin 294, running across the slot, and each crimping-lever has a tail 295, which extends within the drum, as clearly shown in the sectional part of Fig. 35. Coöperating with these levers are a series of disk cams 296, one for each lever, keyed upon the axle 283 within the drum, as by keys 297, and each having over a portion of its circumference, (about ninety degrees, as shown in Fig. 36,) being that portion on which the lever 293 rests while passing from its uppermost position to its front horizontal position, a projecting surface 298. On the outer side of each bar 289, at the sides of each slot 291, are placed four pins 299, so positioned as to receive the corresponding strand between them and hold it in position while the lever 293 advances and forms a slight crimp or bend in the wire, this advance movement being caused by the tail 295 of each cam striking against the projecting surface 298. It will be seen from Figs. 1 and 3 that the feed-drum is so positioned with respect to the gripping-dies that the stays occupy an intermediate position between each pair of bars 289, whereby the lateral crimps, as indicated at 300 in Fig. 2, are midway between the stays. It will be observed that the outside strand-wires have their crimps bent inwardly, for which reason the extreme left-hand lever 293 and cam 296 are reversed in position with respect to the other levers and cams.

On each of the hubs 288 at the ends of the drum are mounted and keyed gear-pinions 301, which serve to operate the drum and mesh with a pair of gear-wheels 302, mounted on a shaft 304, which latter is mounted to turn in bearing-boxes 305 at the upper ends of the plates 284. The left-hand end of this shaft extends beyond the bearing-box and has keyed thereon a twelve-tooth ratchet-wheel 306, and a double rock-arm 307 is mounted to turn loosely on the shaft. On the rock-arm is pivoted a pawl 308 upon a pin 309 and is held against the teeth of the ratchet-wheel by a spring 310, and at the end of the rock-arm is a pin 311, connecting it with a pitman 312, whose opposite end is connected with a crank-pin 313, adjustably mounted in the face of the wheel 72 on the intermediate cam-shaft 74. The position of the crank-pin 313 is such as to give the arm 307 an oscillation sufficient to cause the advancement of the ratchet-wheel 306 by either one or two teeth at each stroke, according as it may be desired to space the stays at six or twelve inches apart. The gear-wheel 302 and pinion 301 being in the ratio of two to one, the advancement of one tooth of the ratchet-wheel 306 will produce a rotation of the feed-drum of sixty degrees, causing a feed of the fence of six inches, and the advancement of two teeth of the ratchet-wheel will cause a feed of the fence of twelve inches. If it is desired to have a fence with a twelve-inch stay-spacing, the pin 313 is removed from its position on the wheel 72 (shown in Fig. 1) and inserted in the hole 314, giving the pitman 312 the proper travel to advance the ratchet-wheel 306 two teeth at each stroke, and hence produce double the rate of rotation of the feed-drum.

From the feed-drum 282 the completed fence passes beneath an idle roller 315, mounted in bearing-posts 316 on the brackets 58, and thence passes to the winding-drum, which is here indicated only by a coil of fence 317, the drum itself being outside the limits of the drawings, Figs. 1, 2, and 3, and as it forms no part of our present invention and is common to such machines it is not necessary to illustrate it herein. On the right-hand end of the shaft 304 is shown a pulley 318, over which passes a belt 319 to the winding-drum to cause the completed fence to be coiled upon the latter in the usual manner.

So far no means have been described for crimping the outside strands at the point where the stay-wire ends are coiled around them, and such a crimp is practically necessary to prevent the stay from being shifted along the strand. As a matter of fact it happens that the joint sometimes sticks in the coiler or gripping-dies at the beginning of the feed and is slightly displaced backward along the strand. Before, therefore, passing to the crimping means it is necessary to move the joint back to its proper position on the strand in case it has become displaced, and to this end we have employed spacers 320, one for each outside strand-wire. (See Figs. 1, 3, 38, and 39.) The spacer 320 is a short bar vertically hung on a pin 321, carried by the forked base-block 322, which is bolted upon the top of the transverse block 164, the back of the spacer abutting against the vertical flange of the bar 164, either directly or indirectly by a set-screw 323, having a lock-nut 324 for the purpose of adjusting and fixing its exact position. In the lower end of the spacer is a vertical notch 325, through which passes the strand-wire A' or A⁷ and which is small enough at its upper end to catch the stay-wire joint and push it forward when the carriage advances in case it has become displaced. It will be seen from Fig. 39 that during the backward movement of the carriage the spacer tilts and rides over the joint, and subsequently during the forward movement pushes it up into proper position. It has been found advisable to provide a spring of some sort, here exemplified as a plate-spring 326, secured under the bolt 327, which holds the base-block 322 and abutting against a heel 328 on the spacer when the latter is tilted forward, the function of said spring being to cause the spacer to resume its vertical position as soon as it has passed over the stay-joint and to prevent it from swinging. This spring, however, is not absolutely essential, and other forms of spring might be substituted therefor.

Between the carriage and the feed-drum there is mounted at each side of the machine a crimper 328 for crimping the outside wires over the joint. (Clearly shown in Figs. 3 and 37, the former showing the right-hand and the latter the left-hand crimper.) The crimper comprises a frame 329, having flanges 330 by which it is bolted to the frame 51, and a pair of crimping-dies 331 332, the former of which is mounted to reciprocate vertically in a suitable recess in the frame and secured in place by plates 334 335, while the upper die 332, which is a little thicker than the recess in which it is mounted, is clamped in fixed position by means of a plate 333. The lower crimping-die 331 projects below the bottom of the frame 328 and may be provided with a hardened-steel wear-block 336, set therein and resting on the surface of a cam 337, keyed upon the front cam-shaft 79. This die is preferably held against the surface of the cam and its downward movement secured by a coiled spring 338, connecting a pin 339 on the frame with a pin 340 on the face of the die. The upper die 332 has a certain amount of vertical adjustment and is adjusted into proper crimping position by a set-screw 343, mounted on the frame 329 and abutting against the upper end of the die and provided with a lock-nut 344. In cases where the strand-wire A' or A⁷ has to be spliced it is desirable to remove the die 332 while the spliced portion of the strand is passing through the crimper, as the wire being here of double thickness the normal action of the crimper would cause accidents and breakage. Hence we provide the clamping-plate 333 with a slot 333ᵃ, which when the holding-bolt is released enables the plate to be readily thrown back, and the die is provided with a pin 341 projecting from its face, by which it may be seized and removed. The two dies have, respectively, a depression 345 and a knuckle 346 in the center of proper form to force the stay-joint into said depression when the dies are squeezed together by the action of the cam 337—that is to say, when the cam has rotated into the position shown in dotted lines, Fig. 37, when the dies will occupy the position shown in dotted lines, thus producing a slight crimp in the strand at this point sufficient to prevent displacement of the joint. On further rotation of the cam the lower die is again dropped, and the fence being then fed along by the feed-drum, as previously described, the crimped joint passes out of the dies and is replaced by the next succeeding joint.

In order that the carriage may in its forward position always come to rest at exactly the point at which the carriers are in line to receive the stay-wires and the axis of the coilers lies in the central plane of the gripping-dies, we provide at each side of the frame 51 a post 346, having an abutment-screw 347 mounted therein, which is adjusted until its end abuts against the front of the carriage-platform when the latter is in the position above mentioned.

By the foregoing description those skilled in the art will, it is thought, readily understand the mode of operation of the machine as a whole; but in order that this may be perfectly clear the cycle of operations may be briefly stated as follows: The machine being in the position shown in Figs. 1 and 2, in which the carriage is in its forward position and the carriers ready to receive the stay-wires, the first movement is the feed of the stay-wires into the carriers by the continuous rotation of the crank 88, Fig. 2, acting upon the feed mechanism 85. The gripping-dies 93 94 are then opened by the action of their respective cams 125 150 releasing the strand-wires, and the latter are advanced the distance of one stay-spacing by the partial rotation of the feed-drum 282, which at the same time, by the action of the cams 296 upon the levers 293, bends each strand-wire and causes a crimp to be placed therein. While the feed-drum is advancing, the pulley 318 also rotates and causes an additional length of fence equal to that released from the feed-drum to be wound upon the coil 317. The mechanism will then be in the position of Fig. 3, in which one-third of a cycle, or one hundred and twenty degrees, has been completed beyond the position shown in Figs. 1 and 2. Next the cam 274 on the rear cam-shaft 73 by striking against its roller 278 causes the carriage to retire, the locking-dog 259 having been previously raised into one of the notches 257 by the cam 265, whereby the coilers are locked in position. By the same movement of the carriage the coilers are retired and the carriers 91 and 92, into which the stay-wires have been fed, are advanced and caused to cut off their several lengths of stay-wire and to take up positions between the gripping-dies, as shown in Fig. 26. Simultaneously also the cam 337 raises the lower crimping-die 331 and places a crimp in one of the previously-formed joints. The gripping-dies next close together over the strands and stays, putting a crimp in each strand, (except the outside strands.) The carriage 62 is thereupon immediately advanced by the striking of the cam 273 on the shaft 73 against the roller 277 on the yoke 275, and the gripping-dies being still closed together hold the stay-wires and pull them out from between the jaws of the carriers, which advance until they occupy their original position, and the coilers being also moved back to their original position receive the stay-wires in their respective slits 219. With the advance movement of the carriage the spacers 320 upon the outside strands pull up the stay-joints previously made into their proper position if the latter have been displaced. During the forward movement of the carriage also the presser-fingers 270, Fig. 29, are turned into vertical position by striking against the rear end of the slots 271 and bend the outside stay-wire ends over into the recesses of the end-coiler dies 220. The continued rotation of the cam 265 on the shaft 73, Fig. 32, causes the locking-dog 259 to be dropped, and the machine having reached its original position, Fig. 1, the pitman 247 raises the rock-arm 244, rotating the coiler-gearing, and the coilers being rotated coil each stay-wire end about its neighbor or about the strand-wire, as the case may be, during which time it will be understood the carriers are again receiving further lengths of stay-wires from the feed mechanism 85. The coiling and stay-feeding movements having been completed, the gripping-dies are again opened, the coilers locked in position, and the cycle proceeds as before.

We wish it clearly understood that we do not confine ourselves to the exact arrangement of the parts as herein described, nor to a machine in which all the features we have described are embodied. We also recognize the fact that some of the novel subcombinations herein claimed are useful in other kinds of wire-working machines than those for making wire fences, as well as in other types of wire-fence machines. We therefore reserve the right to use such subcombinations in other connections than that described and to vary from the specific forms described while retaining the spirit and principle of our invention as embodied in the following claims.

Having thus described our invention, what we claim as new, and desire to secure by Letters Patent, is—

1. A square-mesh wire-fence machine comprising, in combination, means for holding a number of strand-wires in parallel relation, means for cutting stay-wire lengths and placing them in position on the strand-wires, and a coiling mechanism adapted to intercoil adjacent stay-wire ends each about the straight part of the other stay-wire with a strand-wire between them.

2. A wire-fence machine for square-mesh fence comprising, in combination, means for holding a number of strand-wires in parallel relation, means for placing a plurality of stay-wire lengths in position on said strand-wires, and coiling mechanism adapted to wrap two adjacent overlapping stay-wire ends each about the straight part of the other stay-wire with a strand-wire between them.

3. A wire-fence machine for square-mesh fence, comprising, in combination, means for holding a number of strand-wires in parallel relation, means for placing a plurality of stay-wire lengths in position on said strand-wires, means for gripping said stay-wires in place on said strand-wires and simultaneously crimping the strand-wires, and coiling mechanism adapted to wrap two adjacent overlapping stay-wire ends about each other with a strand-wire between them.

4. A wire-fence machine for square-mesh fence comprising, in combination, means for maintaining a plurality of strand-wires in parallel relation, means for placing a plurality of stay-wires in position across said strand-wires, coiling mechanism adapted to wrap adjacent stay-wire ends about each other with a strand-wire between them, and means for crimping the strand-wires at the joint.

5. A wire-fence machine for square-mesh fence comprising, in combination, means for maintaining a plurality of strand-wires in parallel relation, means for placing a plurality of stay-wires in position across said strand-wires, coiling mechanism adapted to wrap adjacent stay-wire ends about each other with a strand-wire between them, means for crimping the strand-wires at the joint, and means for placing a secondary crimp in the strand-wires intermediately between the stays.

6. A wire-fence machine for square-mesh fence comprising means for maintaining a number of strand-wires in parallel relation, means for placing a plurality of stay-wires in position across said strand-wires, grippers adapted to hold said stay-wires and crimp the strands at the joint, and coiling mechanism adapted to interlock the stay-wire ends with the strands.

7. A wire-fence machine for square-mesh fence, comprising means for maintaining a plurality of strand-wires in parallel relation, carriers adapted to place the stay-wires in position on the strands, grippers adapted to hold the stay-wires in place on said strands, and coiling mechanism adapted to interlock the stay-wire ends about the strands.

8. A wire-fence machine for square-mesh fence, comprising means for maintaining a plurality of strand-wires in parallel relation, carriers adapted to place the stay-wires in position on the strands, grippers adapted to hold the stay-wires in place on said strands and simultaneously crimp said strands at the joint, and coiling mechanism adapted to interlock the stay-wire ends about the strands.

9. A wire-fence machine for square-mesh fence, comprising means for advancing a number of parallel strand-wires, cutters and carriers adapted to cut off pieces of stay-wire and place them in position on said strands, and coiling mechanism adapted to interlock adjacent stay-wire ends about the strands.

10. A wire-fence machine for square-mesh fence, comprising, in combination, means for advancing a number of parallel strand-wires, cutters and carriers adapted to cut the stay-wires and place them in position on said strands, grippers adapted to hold said stay-wires during the coiling operation and also place a crimp in each strand-wire over the joint, and means for intercoiling adjacent stay-wire ends.

11. A wire-fence machine for square-mesh fence comprising, means for maintaining in parallel relation a number of strand-wires, carriers adapted to convey the stay-wires to place on the strands, means for feeding stay-wires into said carriers, grippers adapted to hold said stay-wires in position while being coiled, and coiling mechanism adapted to interlock the stay-wire ends with the strands.

12. A wire-fence machine for square-mesh fence comprising means for maintaining in parallel relation a number of strand-wires, carriers adapted to convey the stay-wires to place on the strands, means for feeding stay-wires into said carriers, grippers adapted to hold said stay-wires in position while being coiled, and mechanism for wrapping adjacent stay-wire ends about each other with a strand-wire between them.

13. A wire-fence machine for square-mesh fence comprising, means for maintaining in parallel relation a number of strand-wires, carriers adapted to convey the stay-wires to place on the strands, means for feeding stay-wires into said carriers, grippers adapted to hold said stay-wires in position while being coiled, and means for placing a crimp in each strand-wire at the joint.

14. A wire-fence machine for square-mesh fence comprising, in combination, means for maintaining in parallel relation a number of strand-wires, means for advancing said strand-wires after the formation of each stay, carriers having means for cutting the stay-wires from continuous lengths and placing them in position on the strands, means for feeding said continuous lengths into said carriers, and means for interlocking the stay-wires with a strand to form a stay.

15. A wire-fence machine for square-mesh fence comprising, in combination, means for maintaining in parallel relation a number of strand-wires, means for advancing said strand-wires after the formation of each stay, carriers having means for cutting the stay-wires from continuous lengths and placing them in position on the strands, means for feeding said continuous lengths into said carriers, and means for coiling adjacent stay-wire ends about each other with a strand-wire between them.

16. A wire-fence machine for square-mesh fence comprising, in combination, means for maintaining in parallel relation a number of strand-wires, means for advancing said strand-wires after the formation of each stay, carriers having means for cutting the stay-wires from continuous lengths and placing them in position on the strands, means for feeding said continuous lengths into said carriers, grippers adapted to hold the stay-wires in position during the coiling operation and simultaneously crimp said strands, and coiling mechanism adapted to intercoil adjacent stay-wire ends.

17. A wire-fence machine for square-mesh fence comprising, in combination, means for maintaining in parallel relation a number of strand-wires, means for advancing said strand-wires and placing an intermediate crimp therein, carriers adapted to cut off the several stay-wire lengths and place them in position on said strands, means for feeding wires to the several carriers, grippers adapted to hold the stay-wires in position and simultaneously crimp the strands, coilers adapted to wrap overlapping stay-wire ends about each other with a strand-wire between them, and means for operating said coilers while the stay-wires are being held by said grippers.

18. A wire-fence machine for square-mesh fence comprising means for maintaining a number of strand-wires in parallel relation and at unequal distances from one another, carriers adapted to convey the stay-wire lengths into position on said strands, means for cutting off unequal lengths of stay-wires which are delivered to said carriers proportional to the several said distances, and means for intercoiling the several stay-wire ends about the strands.

19. A wire-fence machine for square-mesh fence comprising means for maintaining a number of strand-wires in parallel relation and at unequal distances from one another, carriers adapted to convey the stay-wire lengths into position on said strands, means for cutting off unequal lengths of stay-wires which are delivered to said carriers proportional to the several said distances, and means for intercoiling the several stay-wire ends about each other with a strand-wire between them.

20. A wire-fence machine for square-mesh fence comprising means for maintaining a number of strand-wires in parallel relation and at unequal distances from one another, means for feeding in and cutting off stay-wire lengths proportional to the distances between the several strand-wires, means for placing said lengths in position on said strands, and coiling means adapted to wrap adjacent stay-wire ends each about the straight part of the other stay-wire with a strand-wire between them.

21. A wire-fence machine for square-mesh fence comprising means for maintaining a number of strand-wires in parallel relation and at unequal distances from one another, a plurality of carriers having cutting mechanism adapted to cut off stay-wire lengths and convey them to place on said strand-wires, means for feeding unequal lengths of stay-wire proportional to the distances of the several strands to the several carriers, and means for intercoiling the stay-wire ends about the strands.

22. A wire-fence machine for square-mesh fence comprising means for maintaining a number of strand-wires in parallel relation, means for advancing said strand-wires with the formation of each stay, a reciprocating carriage, coilers mounted on said carriage, carriers also mounted on said carriage, means for feeding the stay-wires to said carriers when said carriage is in one position, gripping means mounted independently of said carriage, said carriers being arranged to convey the stay-wires to the grippers on the movement of the carriage to its opposite position, means for operating said grippers when the carriage is in this position to hold the stay-wires in position on the strands, said coilers being adapted by the return of the carriage to its first position to advance and receive the stay-wires into operative position in relation thereto, and means for operating said coilers while the carriage is in said first-named position.

23. A wire-fence machine for square-mesh fence, comprising means for maintaining a number of strand-wires in parallel relation, means for advancing said strand-wires as each stay is formed, a reciprocating carriage, cutters and carriers mounted on said carriage, means for feeding wire to said cutters and carriers when the carriage is in one position, said cutters and carriers being arranged to cut off stay-wire lengths from said wire and place them in position on said strand-wires when said carriage moves to its opposite position, independently-mounted grippers adapted to grip said stay-wire lengths and remove them from the carriers, rotary coilers mounted on said carriage and arranged to advance into operative position when the carriage returns to its original position, and means for rotating said coilers in this position, whereby the stay-wire ends are interlocked about the strands.

24. A wire-fence machine for square-mesh fence comprising a feed-drum adapted to advance a number of parallel strand-wires longitudinally through the machine, means carried by said drum for placing intermediate crimps between the stays in the several strand-wires, a reciprocating carriage, a number of carriers mounted thereon and arranged to receive wire for the stays when the carriage is in its advanced position, means for feeding said wire to said carriers, cutting mechanism in connection with said carriers, whereby they are caused to cut off stay-wire lengths on the retreating movement of the carriage, said carriers being arranged to place the cut-off lengths in proper position on the strands, a number of pairs of grippers mounted to reciprocate transversely, means for closing said grippers upon the stay-wires and strands when the stay-wires are so placed, rotary coilers mounted on said carriage on the rear side of said grippers and arranged to advance with said carriage and receive said stay-wires while held by the grippers into coaxial position therewith, and means for rotating the coilers while in this position to form the stay-joints, said grippers being arranged to release the stays and strands immediately after the formation of the joint.

25. In a wire-working machine, a pair of gripping-dies having one a boss and the other a recess adapted to form a crimp in a wire held in the plane of the dies and arranged to hold a pair of transverse wires simultaneously with said first-named wire.

26. In a wire-working machine, a pair of gripping and crimping dies having one a recess and the other a boss or knuckle fitting thereinto, said boss and recess being arranged to form a crimp in a wire lying in the plane of said dies and gripped thereby and having also each a subsidiary notch adapted to hold a second wire against said first-named wire and transversely thereto.

27. In a wire-working machine, a gripping-die having a flattened edge and a longitudinal groove therein, said edge having a transverse notch or recess, and means for pressing a wire lying in said groove into said recess so as to form a crimp in the wire.

28. In a wire-working machine, a gripping-die having a flattened edge and a longitudinal groove therein, said edge having a transverse notch or recess, and means for pressing a wire lying in said groove into said recess so as to form a crimp in the wire, said die having also a subsidiary notch at the center of said first-named notch or recess adapted to hold a transverse wire against said first-named wire when the latter is pressed into said recess.

29. In a wire-working machine, a crimping-die having a flattened operative edge and a longitudinal boss or knuckle therein, in combination with means for holding a wire in the plane of said edge and pressing it over said knuckle, whereby to form a crimp in said wire, said die having also a subsidiary notch at the center of said boss and adapted to firmly hold a transverse wire against said first-named wire.

30. In a wire-working machine, a carrier having jaws at least one of which is resiliently mounted, in combination with means for inserting a wire between said jaws, means for moving said carrier to convey the wire to another position, and means for seizing said wire and removing it from said jaws.

31. In a wire-working machine, a carrier having a pair of jaws, one of which has an oscillating movement toward and from the other, and resilient means for pressing said oscillating jaw against the fixed jaw, said jaws having a bore adapted to receive a wire which is held between said jaws.

32. In a wire-working machine, a carrier having a pair of jaws, one of which may be fixed and the other has an oscillating movement, resilient means for holding said oscillating jaw against the fixed jaw, there being a bore between the two jaws adapted to receive a wire therein, and an independent piece mounted on one of said jaws and adapted to press resiliently upon the wire held between said jaws.

33. In a wire-working machine, a carrier comprising a fixed jaw, an oscillating jaw, means for pressing the oscillating jaw against the fixed jaw, the two jaws having a cylindrical bore between them adapted to receive and hold a wire, and a spring mounted on one of said jaws and projecting through the jaw into said bore, whereby to hold the wire against endwise motion.

34. In a wire-working machine, a carrier comprising a member having pivot-lugs, a jaw fixed to said member, an oscillating jaw, and a spring-plate secured to said oscillating jaw and pressing it against said fixed jaw, in combination with a pivot upon which said carrier is mounted, means for moving said pivot back and forth, and means for oscillating said carrier about said pivot in a definite manner.

35. In a wire-working machine, a carrier comprising a member pivotally mounted, a fixed jaw and a movable jaw mounted on said member, said jaws having a cylindrical bore adapted to receive and hold a wire between them, and a shear-blade inserted between the two jaws in one edge thereof; in combination with means for moving said carrier back and forth, and a cutting-block operating in connection with said shear-blade to cut off a length of wire in said jaw.

36. In a wire-working machine, a carrier comprising a member pivotally mounted, a fixed jaw and a movable jaw mounted on said member, said jaws having a cylindrical bore adapted to receive and hold a wire between them, and a shear-blade on one edge thereof; in combination with means for moving said carrier back and forth, and a cutting-block operating in connection with said shear-blade to cut off a length of wire in said jaw.

37. In a wire-working machine, a carrier comprising a member pivotally mounted, a fixed jaw and a movable jaw mounted on said member and adapted to receive and hold a wire between them, and a shear-blade on one edge thereof; in combination with means for moving said carrier back and forth, and a cutting-block operating in connection with said shear-blade to cut off a length of wire in said jaw.

38. In a wire-working machine, a crimper comprising a box-frame having a longitudinal recess, a pair of dies having respectively a bossed and a recessed end removably housed in said recess, means for holding said dies in said recess permitting one of said dies to reciprocate therein toward and from the other die, means acting on the butt-end of said die to periodically advance it, a clamping-piece adapted to clamp the other die in position in said recess, and a set-screw abutting against the butt-end of the die whereby the same may be adjusted longitudinally in said recess.

39. In a wire-working machine, coiling mechanism comprising one or more rotary coilers each being formed of a short shaft having on its ends coiling means and a radial slit therein adapted to receive a wire axially, coiler-blocks having bearings in which said coilers are mounted, each coiler-block having also a radial slit from the bearing to the exterior, thus enabling a wire to be inserted within the coiler, in combination with means for rotating said coilers, and means for conveying wires into axial position within the coilers.

40. In a wire-working machine, coiling mechanism comprising a plurality of coilers each comprising a short shaft having a radial slit adapted to receive a wire axially, coiler-blocks having bearings in which said coilers turn, the ends of adjacent coilers being separated by a small distance and having coiler-dies formed therein, said blocks having radial slits to enable wires to be inserted into said coilers, means on said coiler-blocks for bending over the projecting ends of adjacent wires when the wires are conveyed into position in said coilers, and means for conveying said wires into position within said coilers.

41. In a wire-working machine, coiling mechanism comprising a rotary coiler consisting of a short shaft having a radial slit adapted to receive a wire axially and a conformation on the end of said shaft adapted to wrap the bent-over end of a wire about a wire passing through the axis of the shaft, a coiler-block in which said coiler is journaled, said block having also a slit from the exterior to the bearing, whereby to admit a wire to the axis of said coiler, and a projecting lip on one margin of said last-mentioned slit adapted to bend over the projecting end of a wire which is pushed thereagainst and into said coiler.

42. In a wire-working machine, coiling mechanism comprising a pair of rotary coaxially-mounted coilers, each consisting of a shaft having a radial slit, the two coilers having coiling conformations on their opposing faces, means for rotating said coilers, a pair of bearing-posts in which said coilers are journaled each having a radial slit from the journal to the exterior adapted to register with the slits in the respective coilers in one position of the latter, a pair of inclined lips on the margins of one of said last-named slits, and a pair of oppositely-inclined lips on the other slit, whereby a pair of wires conveyed into axial position in the respective coilers pass between the lips of one pair and have their projecting ends bent over by one of the lips of the other pair.

43. In a wire-working machine, coiling mechanism comprising a pair of coaxially-mounted rotary coilers, each consisting of a shaft having a radial slit therein to receive a wire axially, coiler-dies formed on the opposing ends of said shafts and consisting of recesses formed around the slit and adapted to receive the bent-over end of a wire, a pair of bearing-posts in which the respective coilers are journaled, the coiling-dies projecting from the opposing faces of said posts, said posts having each a radial slit therein adapted to admit a wire into axial position within said coilers, a pair of upwardly-turned lips on one of said posts at the margins of the slit thereof and arranged to admit a wire between them into the coiler carried by this post and bend over the end of a wire carried by the other post by the striking of said wire upon the lower lip, and a pair of downwardly-bent lips carried by the second post on the margins of the slit thereof and adapted to admit a wire between them into the coiler carried by this post and to bend over the projecting end of said first-named wire by the striking of said wire against the upper lip; in combination with means for conveying a pair of wires into axial position in said coilers in the aforesaid manner, whereby the overlapping ends of the wires are bent over and brought into coiling position in said dies, and means for rotating the coilers in opposite directions when said wires are so placed.

44. In a wire-working machine, gripping means comprising a reciprocating die-carriage, a die mounted therein, an opposing die reciprocally mounted, and a cam-bar reciprocating at right angles to said opposing die and having a cam-slot therein adapted to advance and withdraw said opposing die on reciprocation of said bar.

45. In a wire-working machine, the combination of a vertically-reciprocating die-carriage, means for reciprocating said carriage, a set of gripping-dies mounted in said carriage, a stationary head-block, a set of opposing dies mounted to reciprocate vertically in said head-block, a set of opposing dies having each a projection 146, a horizontally-reciprocating cam-bar having cam-slots therein engaging said projections 146 so as to raise and lower the dies on the reciprocation of said bar, and means for reciprocating said bar synchronously with said first-named dies.

46. In a wire-working machine, the combination of a set of gripping-dies slidably mounted and having each a projection, a cam-bar mounted to reciprocate in a direction at right angles to said dies and having cam-slots engaging the several projections, whereby to reciprocate said dies simultaneously, and means for individually adjusting the range of motion of said dies.

47. In a wire-working machine, the combination of a set of gripping-dies slidably mounted and having each a projection, a cam-bar mounted to reciprocate in a direction at right angles to said dies and having cam-slots engaging the several projections, whereby to reciprocate said dies simultaneously, a set of adjusting-pieces 142 pivotally mounted on said cam-bar and resting on the heads of the individual dies, and means for adjusting the position of said adjusting-pieces.

48. In a wire-working machine, the combination with coiling mechanism, of a rotary shaft driving said mechanism, and locking mechanism comprising a notched disk secured to said shaft, a locking-dog having a projection engaging with the notches in said disk, and means for raising and lowering said dog to lock and release said coiling mechanism.

49. In a wire-working machine, coiling mechanism comprising a tubular shaft through which a wire passes, a recessed die on the end of said shaft, means for conveying a wire against said coiling-die in a position transverse to said first-named wire, means for pressing the end of said transverse wire into the recess of said die, and means for subsequently rotating said die to coil said wire end about said first-named wire.

50. In a wire-working machine, means for coiling one wire about another, comprising a carriage reciprocating in the direction of one wire, a hollow shaft mounted longitudinally on said carriage and through which said wire passes, a recessed coiling-die on the end of said shaft, gripping means adapted to hold a second wire in transverse relation to the first and in position for engaging said die on the advance movement of the carriage, a presser-finger mounted on said gripping means, and caused by the advance movement of the carriage to press the end of said transverse wire into said die, and means for subsequently rotating said shaft to wrap said end about said first-named wire.

51. In a wire-working machine, the combination of means for maintaining a plurality of strand-wires in parallel relation, a carriage reciprocating parallel to said strand-wires, means for engaging stay-wires with said strand-wires to form transverse stays, and one or more spacers mounted on said carriage and consisting of a pivoted piece having a fork therein through which passes one of the strand-wires, said fork being adapted to engage and push forward the stay-joints on the advance movement of said carriage.

52. In a wire-working machine, the combination of means for maintaining a plurality of strand-wires in parallel relation, a carriage reciprocating parallel to said strand-wires, means for engaging stay-wires with said strand-wires to form transverse stays, one or more spacers mounted on said carriage and consisting of a pivoted piece having a fork therein through which passes one of the strand-wires, said fork being adapted to engage and push forward the stay-joints on the advance movement of said carriage, and crimping means adapted to subsequently crimp said strand-wires at each stay-joint.

53. In a wire-working machine, a crimper comprising a frame having a recess, a pair of dies having respectively a bossed and a recessed end, one of said dies being removably housed in said recess and the other reciprocating thereagainst, a piece adapted to releasably clamp said first-named die in its recess, means for adjusting the position of this die with respect to the other, and means for reciprocating the other die.

54. In a wire-working machine, the combination of a stationary axle, a drum rotatably mounted on said axle, means for seizing a wire carried by said drum, and means within said drum and carried by said axle for operating said seizing means.

55. In a wire-working machine, the combination of a stationary axle, a drum having hubs rotating on said axle, means for carrying a wire over the surface of said drum, a crimping-piece mounted on said drum and adapted to crimp said wire, and means mounted on said axle within said drum for operating said crimping means.

56. In a wire-working machine, the combination of a crimping-drum having bearing-hubs at its ends, a movable piece adapted to crimp a wire lying on the surface of said drum, and a stationary member mounted interiorly of said drum and adapted to operate said movable piece by the rotation of said drum.

57. In a wire-working machine, the combination of a feed and crimping drum, means for carrying a wire over the surface of said drum and holding it in place thereon, a piece transversely mounted in said drum and adapted to strike and bend said wire, and a stationary cam mounted interiorly of said drum which operates said piece to hold and crimp a wire on the rotation of said drum.

58. In a wire-working machine, the combination of a feed and crimping drum, means for holding one or more wires in place thereon, one or more crimping-levers projecting from the surface of said drum and oscillating transversely to said wire or wires, said crimping lever or levers having each a tail projecting within said drum, and one or more fixed cams mounted in the interior of said drum and each adapted to strike the tail of one of said crimping-levers on the rotation of said drum to cause it to crimp a wire thereon and simultaneously seize and carry forward said wire.

59. In a wire-working machine, the combination of a stationary axle, a rotary feed and crimping drum having hubs turning on said axle, a plurality of crimping-levers mounted on said drum to oscillate in axial planes, means for holding wires which pass over said drum in position thereon against the action of said levers, and a plurality of cams fixed to said axle within said drum and each adapted to operate one of said levers.

60. A wire-fence machine for square-mesh fence, comprising means for maintaining a number of strand-wires in parallel relation, means for placing a plurality of stay-wires in position across said strand-wires, grippers adapted to hold said stay-wires and crimp the strands at the joint, and coiling mechanism adapted to fix the stay-wire ends to the strands.

61. A wire-fence machine for square-mesh fence, comprising means for maintaining a plurality of strand-wires in parallel relation, carriers adapted to place the stay-wires in position on the strands, grippers adapted to hold the stay-wires in place on said strands and simultaneously crimp said strands at the joint, and coiling mechanism adapted to fix the stay-wire ends to the strands.

62. In a wire-working machine, a carrier comprising a member pivotally mounted, a fixed jaw and a movable jaw mounted on said member and adapted to receive and hold a wire between them, and a shear-blade inserted between the two jaws in one edge thereof; in combination with means for moving said carrier back and forth, and a cutting-block operating in connection with said shear-blade to cut off a length of wire in said jaw.

63. In a wire-working machine, the combination of a stationary base, a horizontally-reciprocating carriage on said base, a shaft having means for operating said carriage, rotary coilers mounted on said carriage, a shaft mounted on said carriage, gearing connecting said shaft with said coilers, a ratchet-wheel mounted on said shaft, a pawl adapted to advance said ratchet-wheel to operate the coilers, a pitman actuating said pawl and itself operated from said shaft, means for supporting a series of strand-wires longitudinally of said carriage, and mechanism adapted to place stay-wires in position for the operation of said coilers.

64. In a wire-working machine, a pair of gripping-dies having one a boss and the other a recess adapted to form a crimp in a wire held in the planes of the dies and arranged to hold a transverse wire simultaneously with the said first-named wire.

In testimony whereof we have hereunto set our hands this 6th day of January, 1905.

AUGUST G. HOEFER.
FREDERICK W. HOEFER.
EMIL A. HOEFER.

Attest:
JESSIE E. VALENTINE,
JAMES HARRIS.